US007446921B2

United States Patent
Suzuki et al.

(10) Patent No.: US 7,446,921 B2
(45) Date of Patent: Nov. 4, 2008

(54) IMAGE FORMING APPARATUS

(75) Inventors: Souichirou Suzuki, Suntou-gun (JP);
Kenjiro Hori, Tokorozawa (JP);
Shimpei Matsuo, Tokyo (JP); Ryuhei Shoji, Suntou-gun (JP); Tatsuya Hotogi, Suntou-gun (JP); Kazunari Fujii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/933,830

(22) Filed: Nov. 1, 2007

(65) Prior Publication Data

US 2008/0106776 A1    May 8, 2008

(30) Foreign Application Priority Data

Nov. 1, 2006 (JP) .............................. 2006-297668
Aug. 21, 2007 (JP) .............................. 2007-214751

(51) Int. Cl.
  *G02B 26/08* (2006.01)
(52) U.S. Cl. ........................................ 359/224; 359/199
(58) Field of Classification Search ................. None
See application file for complete search history.

(56) References Cited

U.S. PATENT DOCUMENTS 4,270,131 A    5/1981 Tompkins
4,441,126 A    4/1984 Greenig
4,859,846 A    8/1989 Burrer
5,969,465 A    10/1999 Neukermans
6,987,595 B2*  1/2006 Bush et al. ................. 359/213
7,271,943 B2*  9/2007 Yasuda et al. ............... 359/224
2002/0122217 A1  9/2002 Nakajima

FOREIGN PATENT DOCUMENTS

| EP | 434449 | 6/1991 |
| EP | 812101 | 12/1997 |
| EP | 1589364 | 10/2005 |
| GB | 2244832 | 12/1991 |
| GB | 2333385 | 7/1999 |
| JP | 2006-035941 A | 2/2006 |

\* cited by examiner

*Primary Examiner*—James Phan
(74) *Attorney, Agent, or Firm*—Canon U.S.A. Inc., I.P. Division

(57) ABSTRACT

An image forming apparatus detects a oscillating state of a oscillation system with a oscillation detector and controls oscillation of the oscillation system such that the oscillation system oscillates a reflective member in a balanced steady state by adjusting a drive force of a drive unit with one or more drive control parameter values on the basis of the detection result obtained by the oscillation detector. When the balanced steady state is detected, the drive control parameter values are stored and are used when an exposure unit is reactivated.

13 Claims, 19 Drawing Sheets

IMAGE FORMING APPARATUS

BACKGROUND OF THE INVENTION

1. Field of the Invention

The present invention relates to image forming apparatuses, and more particularly, to a method for activating a oscillation mirror that oscillates in a rocking manner in an image forming apparatus having an optical scanner that scans a light beam using the oscillating mirror.

2. Description of the Related Art

Rotary optical deflectors including rotatable polygonal mirrors and resonant optical deflectors including resonantly oscillating mirrors are known as optical deflectors for use in image forming apparatuses, such as laser beam printers and digital copying machines.

Rotary optical deflectors are advantageous in that an image bearing member can be reliably scanned with a laser beam at a constant speed and activation control is easy. For this reason, the rotary optical deflectors are commonly used.

On the other hand, various types of resonant optical deflectors including resonantly oscillating mirrors have also been proposed. Compared to rotary optical deflectors including optical scanning systems using rotatable polygonal mirrors, resonant optical deflectors have the following characteristics. That is, the size of the optical deflector can be greatly reduced, power consumption is small, and surface tilting of the mirror theoretically does not occur. In addition, if the optical deflector is made of single crystal silicon (Si) manufactured by a semiconductor process, in theory, no metal fatigue occurs and high durability is obtained. Due to these characteristics, resonant optical deflectors have recently been attracting attention as elements satisfying requirements for size and cost reduction in printers.

However, in resonant optical deflectors, a deflection angle (displacement angle) of a mirror basically varies in a sine curve, and therefore the angular speed is not constant. The deflection angle of the mirror and a scanning angle of scanning light deflected and scanned by the mirror are in a constant relationship, and can be considered equivalent to each other. Therefore, in the following description, the term "deflection angle (displacement angle)" and the term "scanning angle" have similar meanings. A method for compensating for the non-constant angular speed is suggested in, for example, U.S. Pat. No. 4,859,846.

In this method, a resonant optical deflector having oscillation modes with a fundamental frequency and a frequency three times as high as the fundamental frequency is used to allow driving with a substantially triangular wave. FIG. 20 illustrates a micromirror that can be driven with a substantially triangular wave. A resonant optical deflector 12 includes rocking members 14 and 16, torsion springs 18 and 20, a drive unit 23, a drive circuit 50, detectors 15 and 32, and a control circuit 30. The micromirror has a fundamental resonance frequency and a resonance frequency about three times as high as the fundamental resonance frequency, and is driven by a resultant signal having frequency components of the fundamental frequency and the frequency three times as high as the fundamental frequency. Accordingly, the rocking member 14 having a mirror surface is driven with a triangular wave and deflects light at a deflection angle that varies with less variation in angular speed compared to the case in which the rocking member 14 is driven with a sine wave. Oscillation of the rocking member 14 is detected by the detectors 15 and 32, and the control circuit 30 generates a drive signal necessary for obtaining a triangular wave. The drive unit 23 and the drive circuit 50 are used for driving the micromirror. Thus, when light is deflected and scanned, the angular speed is substantially constant in a region larger than that in the case in which the displacement angle varies as a sine wave. Therefore, a larger area can be used within the entire deflecting/scanning area.

The other components shown in FIG. 20 are structured as follows. That is, a displacement detection signal from the detector 32 is supplied to a band-pass filter circuit 36 via a signal line 34. The band-pass filter circuit 36 supplies only a frequency component of a first-order natural frequency oscillation mode (fundamental resonance frequency component) in the detection signal to a first signal line 38 and a second signal line 40. The signal fed via the first signal line 38 is input to a multiplier 42, where the signal is converted into a signal having a frequency three times as large as the fundamental resonance frequency. The multiplier 42 includes a phase adjustment input 54 and an amplitude adjustment input 55. These two inputs are used to adjust the phase and maximum amplitude of an output signal from the multiplier 42 so that the displacement of the rocking member 14 detected by the detector 32 varies in a substantially triangular wave in the deflecting/scanning process.

The signal from the multiplier 42 is input to an adder 46. The adder 46 adds the signal from the multiplier 42 and a frequency signal in the first-order natural frequency oscillation mode obtained through the second signal line 40 and an automatic gain control circuit 60. As a result, a drive signal for the resonant optical deflector 12 is generated. The drive signal is transmitted to the drive circuit 50 via a signal line 48, and the drive unit 23 is driven by a composite waveform of a frequency signal of the first-order natural frequency oscillation mode and a frequency signal with a frequency three times as high as the fundamental resonance frequency.

The automatic gain control circuit 60 includes a peak detection circuit 58, a difference amplifier circuit 61, a preset amplitude 63, an amplifier 62, and a gain control circuit 64. The second signal line 40 is divided into two signal lines 40a and 40b. A signal supplied via the signal line 40a is used by the difference amplifier circuit 61 to detect a difference between a maximum amplitude detected by the peak detection circuit 58 and a value of the preset amplitude 63 that is set in advance. A difference signal representing the thus-obtained difference is transmitted to the amplifier 62 that controls the gain control circuit 64. The gain control circuit 64 is controlled such that a signal having the same amplitude as the preset amplitude 63 can be obtained from the signal supplied via the signal line 40b.

In the structure described in U.S. Pat. No. 4,859,846, the signal from the detectors 15 and 32 is divided into two frequency components using the band-pass filter circuit 36. Therefore, the circuit structure is complex and it is difficult to achieve high-accuracy control.

This problem can be solved by a method described in Japanese Patent Application No. 2006-035491 in which a oscillation system having a plurality of resonance frequencies is controlled so as to perform a desired motion. By using this method to control oscillation of a mirror, an image bearing member can be scanned with a laser beam at a constant speed.

SUMMARY OF THE INVENTION

In light of the above, according to the present invention, the time period from when a resonant optical deflector is activated to when oscillation of a mirror is stabilized is reduced. Control parameter values with which oscillation of the mirror can be stabilized vary depending on characteristic differences between resonant optical deflectors and environmental conditions. Therefore, the activation time of a resonant optical deflector cannot always be reduced by activating the resonant optical deflector using control parameter values stored in advance. Moreover, if the resonant optical deflector is activated using inadequate control parameter values, there is a risk that the resonant optical deflector will be damaged.

In light of the above, the present invention is directed to an image forming apparatus capable of reducing an activation time of a resonant optical deflector irrespective of individual differences in characteristics or variation in environmental conditions.

Embodiments of the present invention are provided to overcome the above-described drawbacks of the related technology.

According to an aspect of the present invention, an image forming apparatus includes a oscillation system including a first oscillating member having a reflective element and a second oscillating member connected to the first oscillating member with a torsion spring and having a permanent magnet; a drive unit arranged to apply a torque to the permanent magnet in the second oscillating member when an electric current is supplied, thereby transmitting a drive force to the first and second oscillating members so that the first and second oscillating members oscillate about an axis of the torsion spring; a light source arranged to emit a light beam; an exposure unit arranged to scan the light beam by causing the light beam to be incident on the reflective element in the first oscillating member; a oscillation detector arranged to detect a oscillating state of the oscillation system; a drive controller configured to control oscillation of the oscillation system such that the oscillation system oscillates in a balanced steady state by adjusting the drive force of the drive unit with one or more drive control parameter values on the basis of the detection result obtained by the oscillation detector; a parameter storage arranged to store the drive control parameter values when the balanced steady state is detected by the oscillation detector; and a parameter resetting controller configured to set the drive control parameter values stored in the parameter storage to the drive controller when the exposure unit is reactivated.

According to the above aspect, the time from when the resonant optical deflector is activated to when the mirror's oscillation is stabilized can be reduced irrespective of characteristic differences between resonant optical deflectors and variation in environmental conditions.

Other features and advantages of the present invention will be apparent from the following description taken in conjunction with the accompanying drawings, in which like reference characters designate the same or similar parts throughout the figures.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Schematic Structure of Image Forming Apparatus

Figure 2:
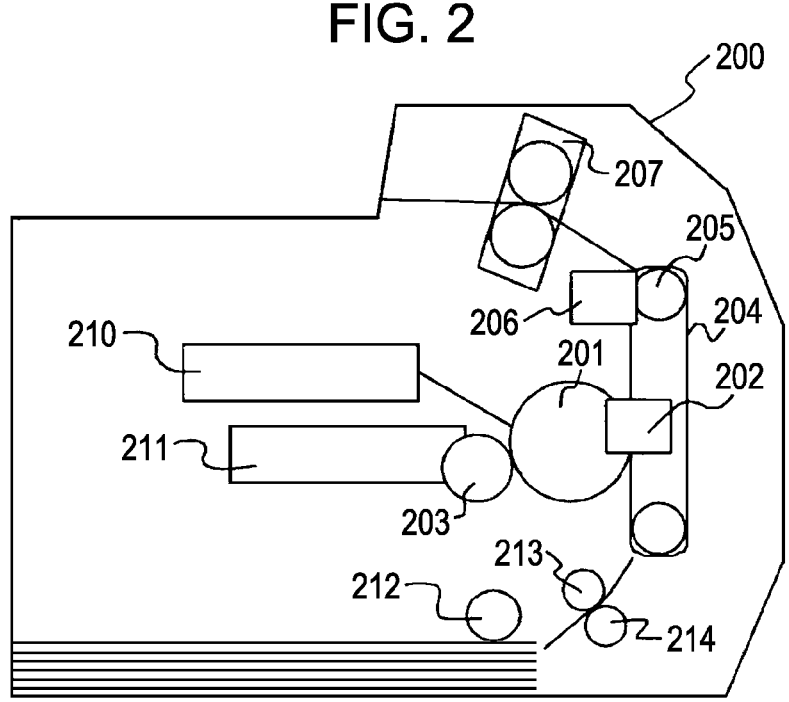
FIG. 2 is a schematic sectional view illustrating the structure of an image forming apparatus according to the present invention.

FIG. 2 is a sectional view illustrating the schematic structure of an image forming apparatus 200 according to the present invention.

Referring to FIG. 2, a photosensitive drum 201 forms an electrostatic latent image and a motor 202 drives the photosensitive drum 201. A laser scanner unit 210, which corresponds to an exposure unit, performs an exposure process in accordance with an image signal to form the electrostatic latent image on the photosensitive drum 201. A developer 211 stores toner, and a development roller 203 discharges the toner supplied from the developer 211 onto the photosensitive drum 201. An endless conveying belt 204 conveys a sheet of paper successively to image forming units for different colors. A drive roller 205 is connected to a drive unit including a motor, a gear, etc., for driving the conveying belt 204. A motor 206 is used for driving the drive roller 205. A fixing unit 207 melts and fixes the toner transferred onto the sheet. A pickup roller 212 conveys the sheet out of a sheet cassette, and conveying rollers 213 and 214 guides the sheet toward the conveying belt 204. The image forming units for different colors (yellow, magenta, cyan, and black) each include the photosensitive drum 201, the laser scanner unit 210, the developer 211, and the development roller 203. FIG. 2 shows only one of the image forming units, and the image forming unit shown in FIG. 2 will be explained below.

Plan View of Laser Scanner

Figure 3:
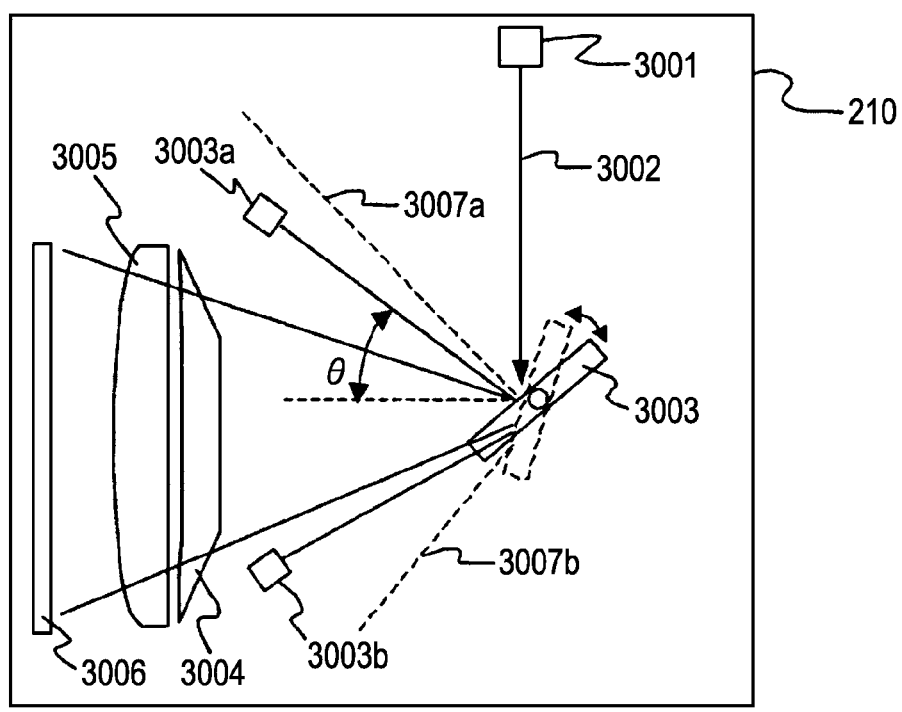
FIG. 3 is a plan view of a laser scanner unit according to the present invention.

FIG. 3 is a plan view of the laser scanner unit 210 having a laser light source using a semiconductor laser. The laser scanner unit 210 includes a semiconductor laser 3001, which corresponds to a light source, and a harmonic oscillation mirror 3003, which corresponds to a reflective element and a oscillation system. The harmonic oscillation mirror 3003 oscillates and deflects a laser beam (LD) 3002 from the semiconductor laser 3001. Beam detection (BD) sensors 3003a and 3003b, which correspond to a oscillation detector, detect the deflected laser beam that is irradiated thereon. The laser scanner unit 210 also includes fθ lenses 3004 and 3005 that converge the laser beam deflected by the harmonic oscillation mirror 3003 on the photosensitive drum 201 and corrects the scanning speed to a constant speed. A folding mirror 3006 reflects the laser beam with a corrected speed toward the photosensitive drum 201. The laser beam is directed in directions shown by 3007a and 3007b when the scanning angle θ of the harmonic oscillation mirror 3003 is at a maximum. The oscillation system including the harmonic oscillation mirror 3003 is capable of simultaneously performing a first oscillating motion with a first frequency and a second oscillating motion with a second frequency. In the oscillation system including the harmonic oscillation mirror 3003, the amplitude and angular frequency of the first oscillating motion are defined as A1' and ω1, respectively, the amplitude and angular frequency of the second oscillating motion are defined as A2' and ω2, respectively, a relative phase difference between the two frequencies is defined as φ', and a time relative to an origin or a reference time is defined as t. In this case, the deflection angle θ of the harmonic oscillation mirror 3003 can be expressed as follows:

$$\theta(t) = A1' \sin(\omega 1 t) + A2' \sin(\omega 2 t + \phi') \quad (1)$$

Detailed Explanation of Resonant Optical Deflector

Figure 18A:
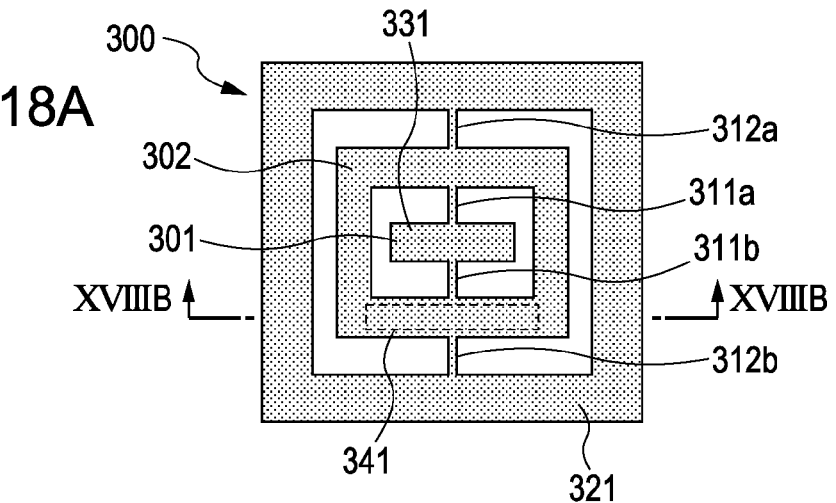
FIGS. 18A to 18C are diagrams illustrating the structure of a resonant optical deflector.
Figure 18B:
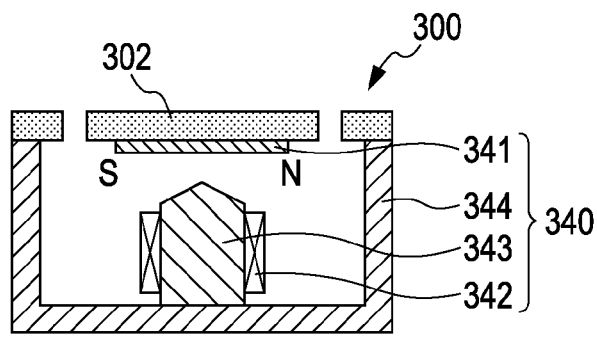
Figure 18C:
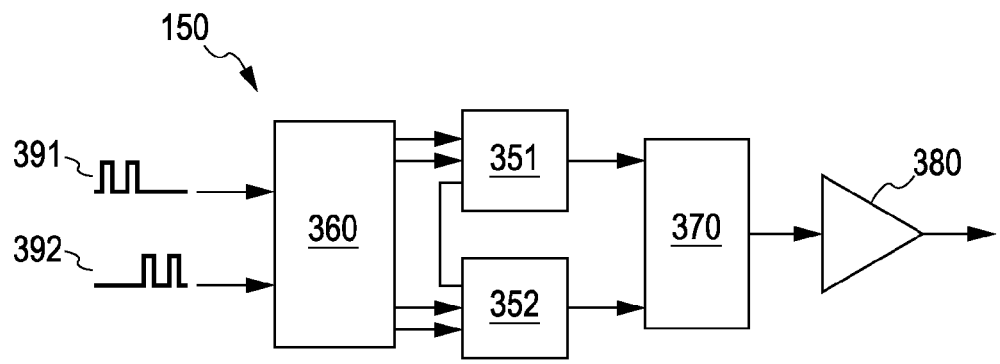

An example of a resonant optical deflector will now be described. FIGS. 18A to 18C are diagrams illustrating the structure of a resonant optical deflector. FIG. 18A is a top view of a oscillation system 101 included in the optical deflector. A plate unit 300 is formed by etching a silicon wafer. A plate-shaped rocking member (first oscillating member) 301 is supported by two torsion members (for example torsion springs 311a and 311b) at upper and lower sides thereof in FIG. 18A. A light reflective film (reflective mirror) 331 is formed on the top surface of the rocking member (first oscillating member) 301. A frame-shaped rocking member (second oscillating member) 302 supports the torsion springs 311a and 311b on inner sides thereof, and is supported by two further torsion members (torsion springs 312a and 312b) at upper and lower sides thereof in FIG. 18A. A frame-shaped supporting member 321 supports the torsion springs 312a and 312b on inner sides thereof. In the present embodiment, the term "oscillating member" and the term "rocking member" have similar meanings.

The oscillation system including the rocking member 301 (first oscillating member), the rocking member 302 (second oscillating member), and the torsion springs 311a, 311b, 312a, and 312b have two oscillation modes. The oscillation system is adjusted such that the frequency of one of the two oscillation modes is substantially twice as high as the frequency of the other oscillation mode. As an example, a case is considered in which the moments of inertia of the rocking member 301 (first oscillating member) and the rocking member 302 (second oscillating member) are I1 and I2, respectively, the spring constants of the torsion springs 311a and 311b are k1/2, and the spring constants of torsion springs 312a and 312b are k2/2. In this case, two natural angular frequencies are set to $\omega 1 = 2\pi \times 2000$ [Hz] and $\omega 2 = 2\pi \times 4000$ [Hz].

FIG. 18B is a schematic diagram illustrating a drive unit included in the optical deflector. FIG. 18B shows a sectional view of the plate unit 300 taken along line XIIIB in FIG. 18A. A permanent magnet 341 is fixed to the bottom surface of the rocking member 302 (second oscillating member). The plate unit 300 is fixed to a yoke 344 made of a material with high magnetic permeability. A core 343 made of a material with high magnetic permeability is disposed on the yoke 344 at a position such that the core 343 faces the permanent magnet 341. A coil 342 is wound around the core 343. The permanent magnet 341, the core 343, and the coil 342 are called a "drive unit" individually or in combination. This drive unit corresponds to a drive unit 106 shown in FIG. 6. The permanent magnet 341, the coil 342, the core 343, and the yoke 344 form an electromagnetic actuator (drive unit) 340. When a current is supplied to the coil 342, a driving torque is applied to the permanent magnet 341 and the rocking member 302 oscillates about the axis of the torsion springs 311a, 311b, 312a, and 312b. Thus, in the present embodiment, drive force can be applied to the rocking members by the permanent magnet 341.

Figure 4:
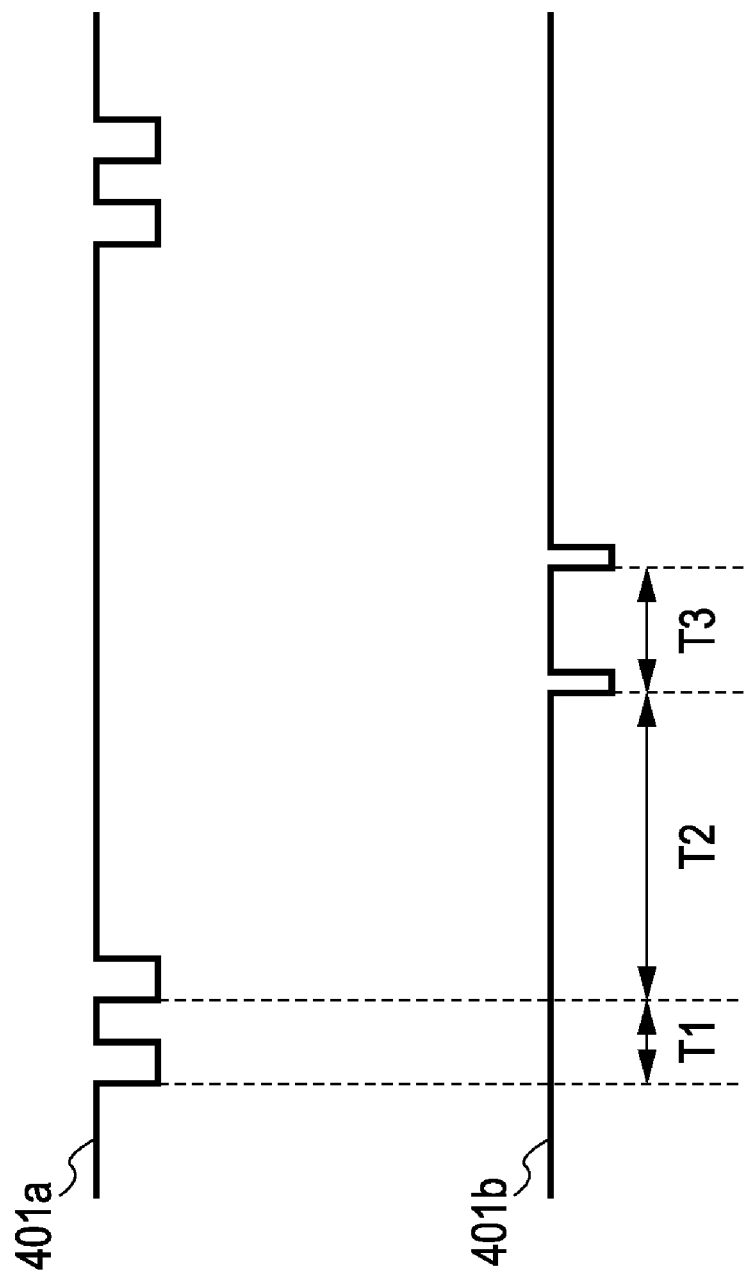
FIGS. 4A and 4B show output signals from BD sensors.

FIG. 18C shows a control unit 150 of the optical deflector. The control unit 150 corresponds to a first/second drive controller 603 and the drive unit 106 in FIG. 6. Referring to FIG. 18C, arbitrary waveform generators 351 and 352 generate sine waves at 2,000 Hz and 4,000 Hz, respectively. The phase and amplitude of each sine wave can be arbitrarily changed in response to a command from an operation unit 360. The thus-generated two sine waves are added together by an adder 370 and amplified by the amplifier 380. Then, a current is supplied to the coil 342. The BD sensors (first and second light-receiving elements) 3003a and 3003b are arranged as shown in FIG. 3, and outputs 391 and 392 from the first and second light-receiving elements 3003a and 3003b are input to the operation unit 360. The operation unit 360 performs an operation for setting the outputs 391 and 392 from the first and second light-receiving elements 3003a and 3003b to arbitrary values. More specifically, the phase and amplitude of each of the sine waves output from the arbitrary waveform generators 351 and 352 are controlled so that a scanning light beam 133 from the optical deflector passes through the first and second light-receiving elements 3003a and 3003b at desired timings. This will be described in more detail below with reference to FIG. 4.

The optical deflector according to the present embodiment is capable of performing optical scanning with two frequency components (for example, optical scanning in which a scanning light beam whose scanning angle varies in a sawtooth pattern).

As described above with reference to Equation (1), the deflection angle θ (see FIG. 3) of the resonant optical deflector of the present embodiment is expressed as follows. That is, when the amplitude and angular frequency of the first oscillating motion are defined as A1' and ω1, respectively, the amplitude and angular frequency of the second oscillating motion are defined as A2' and ω2, respectively, phases for the two frequencies are defined as φ1 and φ2, and an arbitrary time relative to an origin or a reference time in a single period of the first oscillating motion is defined as t, the deflection angle θ is expressed as θ(t)=A1' sin(ω1t+φ1)+A2' sin(ω2t+φ2). In the relationship between the above equation and Equation (1), φ'=φ2−φ1 is satisfied. This motion is sometimes called a composite oscillating motion since the locus is obtained as a composite of sine waves.

Figure 19A:
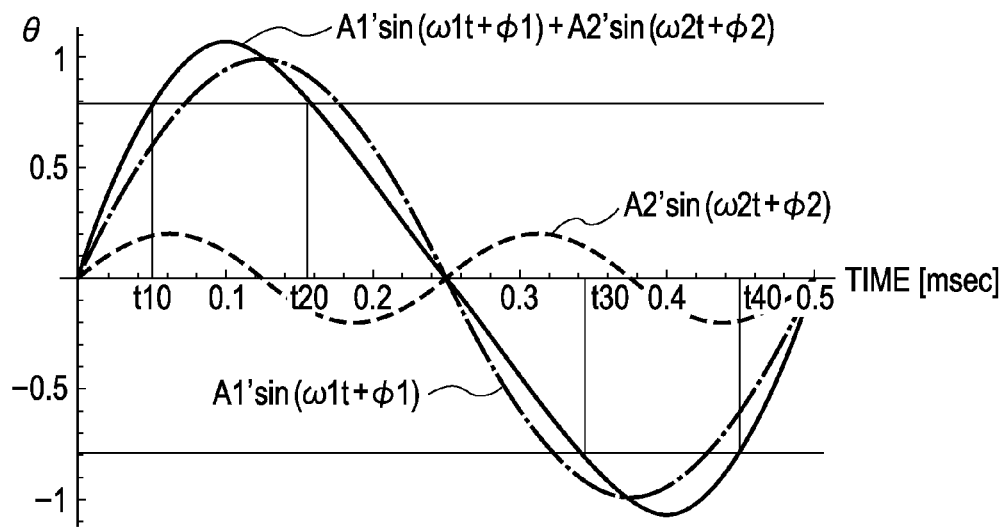
FIGS. 19A and 19B are graphs illustrating examples of variations with time in a deflection angle $\theta$ and an angular speed $\theta'$ in the optical deflector.
Figure 19B:
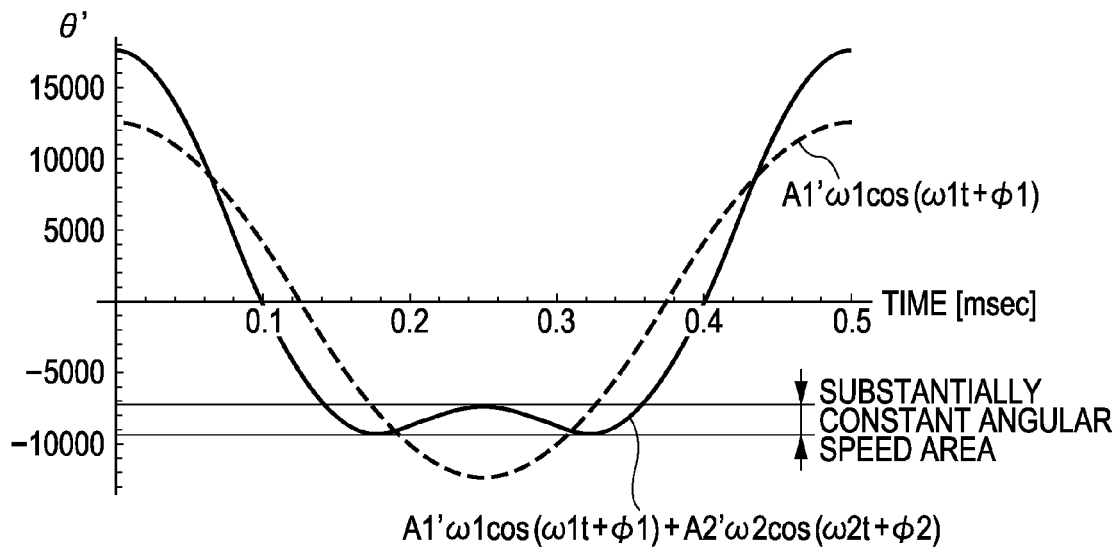
Figure 20:
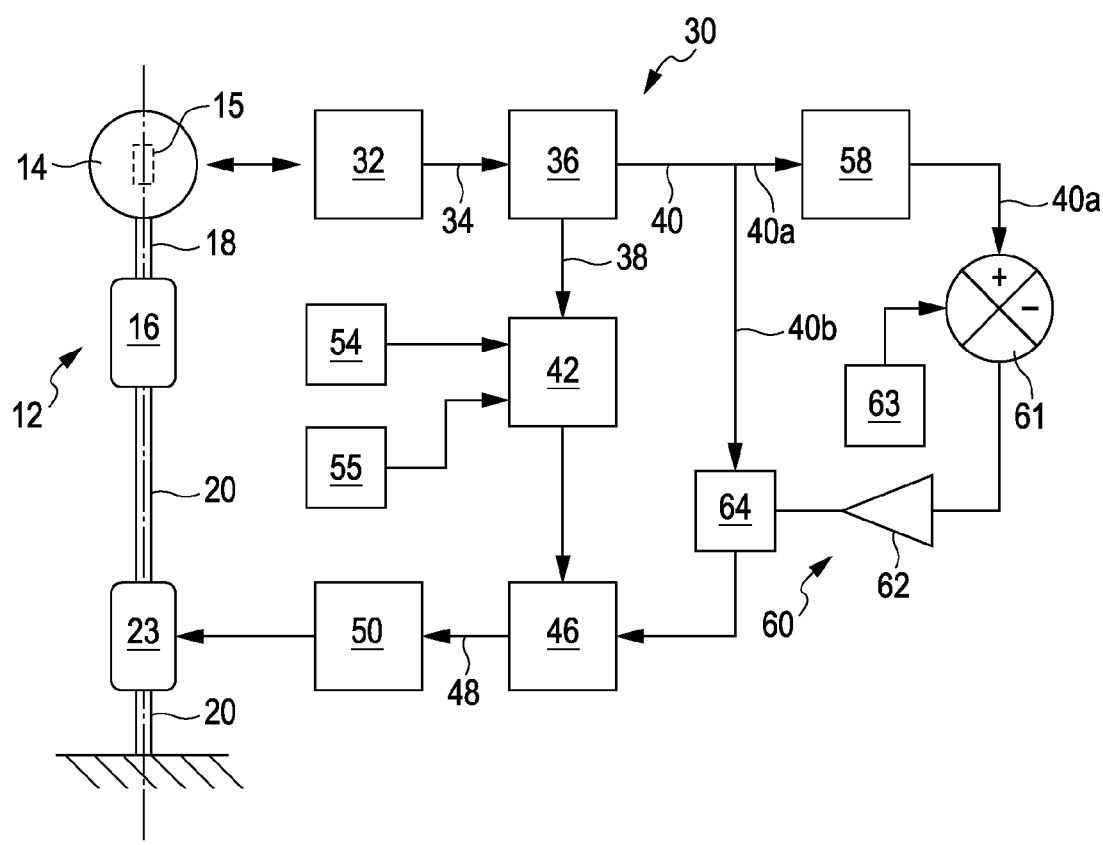
FIG. 20 is a block diagram illustrating a known micromirror system.

When, for example, the parameters are set as A1'=1, A2'=0.2, φ1=0, φ2=0, ω1=2π×2000, and ω2=2π×4000, variation in the deflection angle θ of the optical deflector and the angular speed θ' with time are obtained as shown in FIGS. 19A and 19B, respectively. The deflection angle θ shown by the solid line in FIG. 19A is close to a sawtooth wave compared to a sine wave shown by the dashed line. In addition, the angular speed θ' shown by the solid line in FIG. 19B has a smaller variation compared to that in a sine wave shown by a dashed line in a substantially constant angular speed area.

In the present embodiment, the parameter values are set as A1'=1, A2'=0.2, φ1=0, φ2=0, ω1=2π×2000, and ω2=2π×4000. However, A1', A2', φ1, φ2, ω1, and ω2 may be set to any values as long as variation in the angular speed θ' is smaller than that of a sine wave in the substantially constant angular speed area. For example, maximum and minimum values of the angular speed θ' of the reflective mirror in a continuous period that is equal to or more than 20% of a period corresponding to the first frequency can satisfy the relationship (maximum value−minimum value)/(maximum value+minimum value)<0.1. This is a rough criterion that the optical deflector is required to satisfy. This criterion also applies to other embodiments.

Detection of BD Sensor Signals

FIGS. 4A and 4B show output signals from the BD sensors 3003a and 3003b, respectively. The BD sensors 3003a and 3003b output BD signals 401a and 401b, respectively. T1 to T3 show signal-receiving intervals of the BD signals. T1 shows the time from when the laser beam deflected by the harmonic oscillation mirror 3003 is detected by the BD sensor 3003a to when the laser beam is detected by the BD sensor 3003a again when it returns after reaching the optical-beam scanning direction 3007a that corresponds to the maximum scanning angle. T2 shows the time from when the laser beam deflected by the harmonic oscillation mirror 3003 is detected by the BD sensor 3003a to when the laser beam is detected by the BD sensor 3003b. T3 shows the time from when the laser beam deflected by the harmonic oscillation mirror 3003 is detected by the BD sensor 3003b to when the laser beam is detected by the BD sensor 3003b again when it returns after reaching the optical-beam scanning direction 3007b that also corresponds to the maximum scanning angle.

Drive Control System Block

Figure 1:
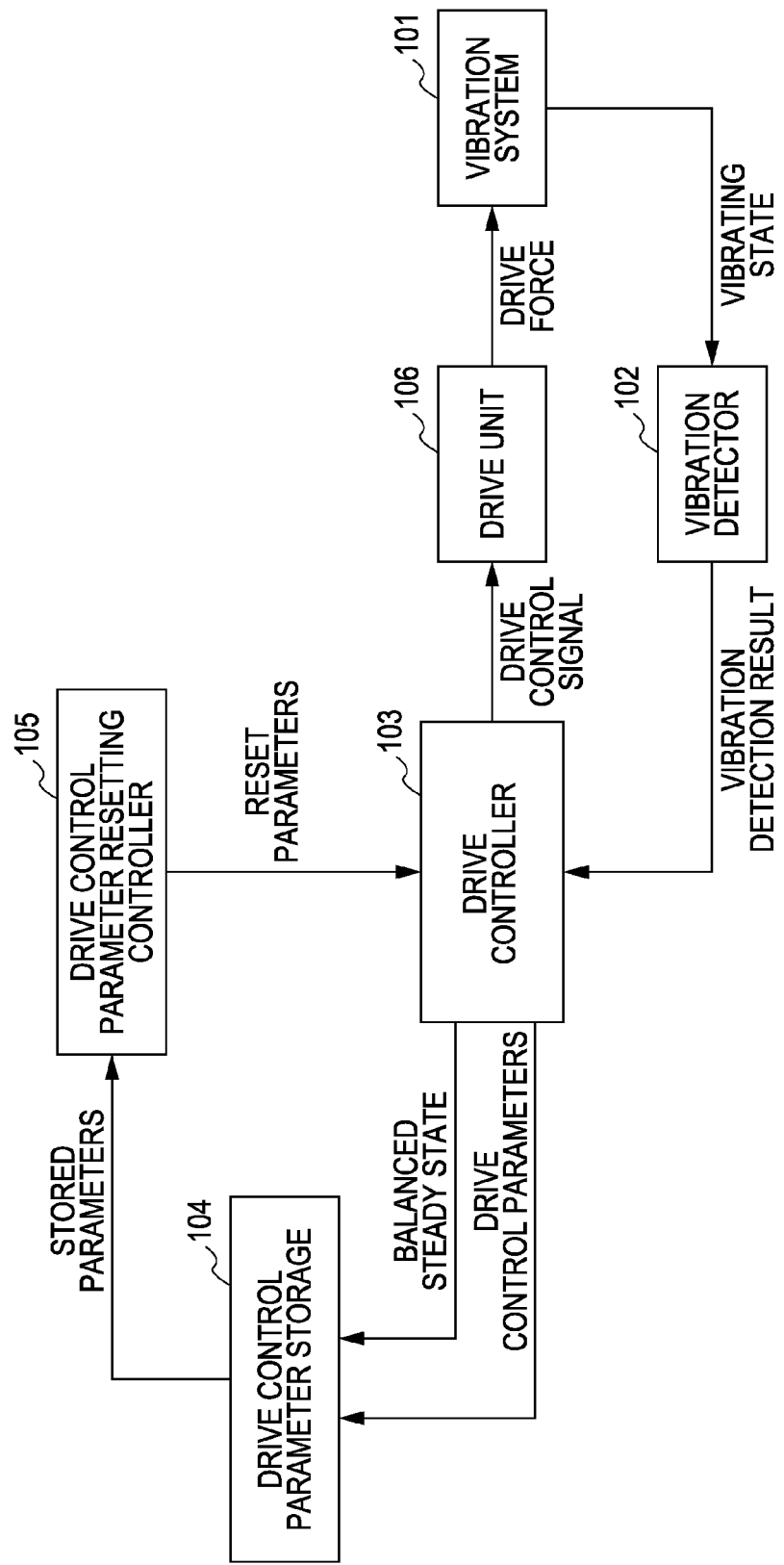
FIG. 1 is a system block diagram illustrating a drive control system of an optical deflector according to a first embodiment of the present invention.

FIG. 1 is a system block diagram illustrating a drive control system of the optical deflector according to the present embodiment.

The oscillation system 101 includes the harmonic oscillation mirror 3003 that oscillates in accordance with a drive force applied thereto. The oscillation system 101 is capable of simultaneously performing a first oscillating motion and a second oscillating motion. In the following description, a oscillating motion at only a first frequency is called a one-degree-of-freedom oscillating motion and a oscillating motion in which both a oscillating motion at the first frequency and a oscillating motion at a second frequency are performed simultaneously is called a two-degree-of-freedom oscillating motion. A oscillation detector 102 detects a oscillation state of the oscillation system 101. The oscillation detector 102 detects the laser beam with the BD sensors 3003a and 3003b and outputs the BD signals 401a and 401b. A drive controller 103 calculates the BD-signal-receiving intervals T1 and T3 from the BD signals. The drive controller 103 also calculates drive control parameter values A1, A2, and φ and outputs a drive control signal to the drive unit 106. A1 is a voltage amplitude corresponding to A1' described above, A2 is a voltage amplitude corresponding to A2' described above, and φ is a relative phase difference between two voltage frequencies corresponding to φ' described above. The drive unit 106 outputs a drive force corresponding to the drive control signal input thereto.

The relationship between T1 to T3, A1, A2, φ, A1', A2', and φ' will be described in more detail in the following items (1) to (5).

(1) First, A1', A2', φ' (φ'=φ2−φ1), ω1, and ω2 in Equation (1) are set to optimum values in advance. Therefore, A1', A2', φ' (φ'=φ2−φ1), ω1, and ω2 will be considered as fixed values (target values) in the following description.

$$\theta(t)=A1'\sin(\omega 1 t)+A2'\sin(\omega 2 t+\phi') \quad (1)$$

(2) The drive control signal can be expressed as "A1 sin(ω1t)+A2 sin(ω2t+φ)".

(3) The manner in which the harmonic oscillation mirror 3003 is currently moving can be determined from the BD-signal-receiving intervals T1 to T3. If ω1 and ω2 in Equation (1) are determined in advance, unknown values in Equation (1) are A1', A2', and φ'. Therefore, the moving state of the harmonic oscillation mirror 3003 can be determined by determining these unknown values. More specifically, it is assumed that an angle θ (in a plan view) between an axis perpendicular to a mirror surface of the harmonic oscillation mirror 3003 and each of the BD sensors 3003a and 3003b shown in FIG. 3 is known. As shown by t10, t20, t30, ..., in the graph of FIG. 19A, the moving state of the harmonic oscillation mirror 3003 can be determined from the values of T1 to T3.

(4) Then, it is determined whether or not the current moving state of the harmonic oscillation mirror 3003 determined by the values of T1 to T3 correspond to Equation (1).

(5) Then, parameter values A1, A2, and φ are adjusted so that T1 to T3 correspond to the moving locus of Equation (1). More specifically, calculations described below are performed to adjust the parameter values A1, A2, and φ so that desired values are obtained as T1 to T3 (in other words, so that desired values are obtained as A1', A2', and φ'). The thus-adjusted parameter values A1, A2, and φ are stored as drive control parameter values and used in the following operation.

Referring to FIG. 1 again, the drive controller 103 detects a balanced steady state of the oscillation system 101 in the two-degree-of-freedom oscillating motion from the oscillation detection result. The drive controller 103 outputs information regarding the balanced steady state and the drive control parameter values A1, A2, and φ to a drive control parameter storage 104. The balanced steady state corresponds to a state in which the oscillation system 101 performs a steady oscillation at a desired deflection angle θ. The balanced steady state is not obtained in a transient state before oscillation of the oscillation system 101 reaches the desired deflection angle θ or the state in which oscillation control is stopped after an issuance of a drive stop command for stopping the drive unit 106. The drive control parameter storage 104 stores the drive control parameter values A1, A2, and φ corresponding to the balanced steady state of the oscillation system 101, and repeatedly updates the drive control parameter values A1, A2, and φ while the oscillation system 101 is in the balanced steady state. In the following description, the term "parameter" is used to express both a variable value and a set value.

When the drive controller 103 stops driving the drive unit 106 and the state of the oscillation system 101 is changed from the balanced steady state, the drive control parameter storage 104 stops updating the drive control parameter values A1, A2, and φ. The drive control parameter values stored in the drive control parameter storage 104 (hereinafter called stored parameter values) are output to a drive control parameter resetting controller 105. The drive control parameter resetting controller 105 outputs the stored parameter values to the drive controller 103 as reset parameter values A11, A21, and φ1. In the following descriptions, A10, A11, etc. represent values that are set as A1. A21, etc. represent values that are set as A2. In addition, φ1 represents a value that is set as φ. When the drive controller 103 starts driving the drive unit 106 again, the reset parameter values A11, A21, and φ1 are used to activate the drive unit 106. When the drive controller 103 activates the drive unit 106 for the first time after the image forming apparatus is manufactured, the drive unit 106 is activated using parameter values that are stored in advance. When the image forming apparatus is manufactured, reset parameter values that are set in advance are stored in the drive control parameter resetting controller 105.

Figure 16:
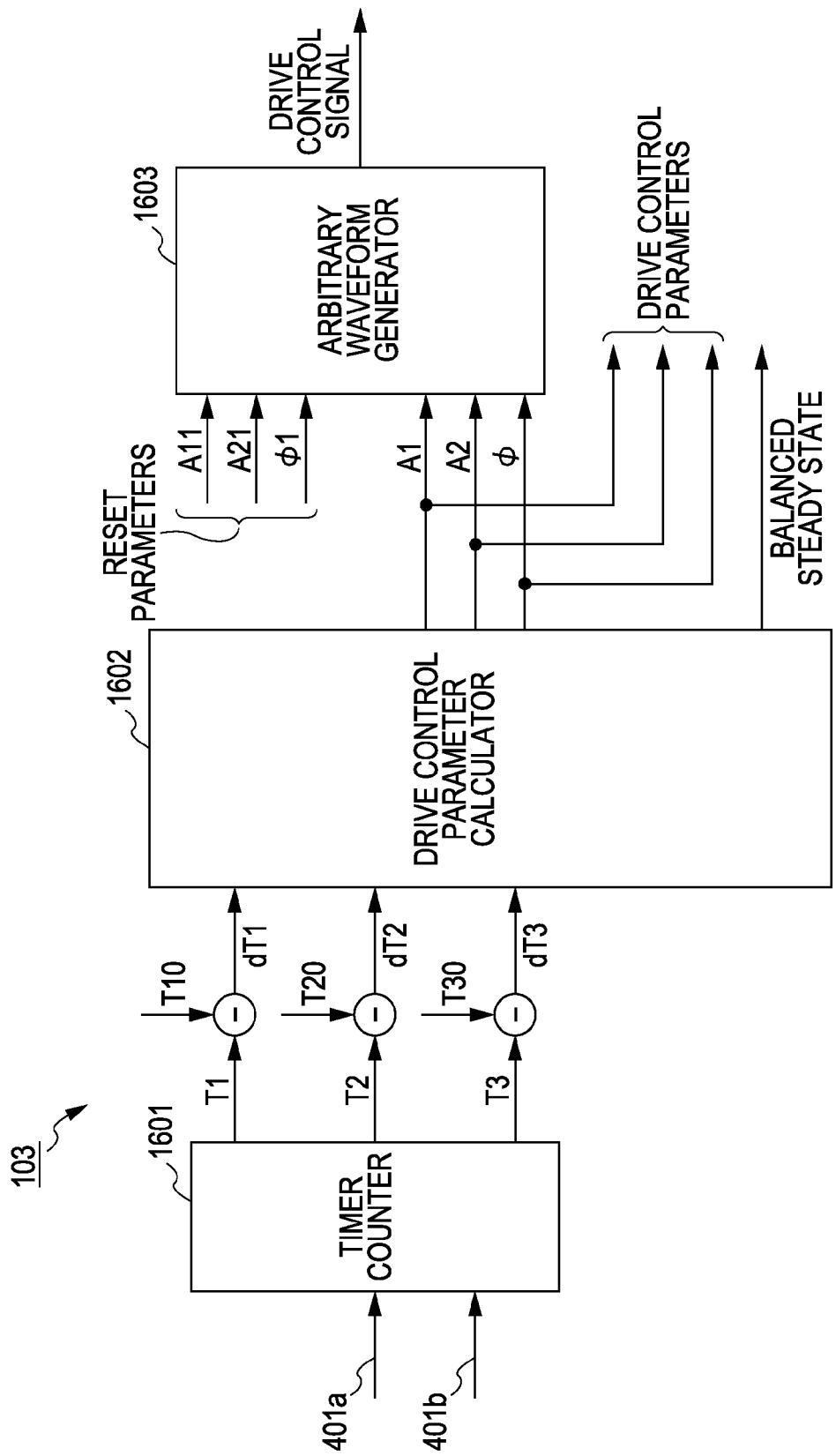
FIG. 16 is a block diagram illustrating a drive control unit included in the optical deflector according to the first embodiment of the present invention.

Detailed Structure of Drive Controller 103 and Method for Calculating Drive Control Parameters FIG. 16 shows a block diagram of the drive controller 103.

A timer counter 1601 determines BD-signal-receiving intervals T1 to T3 from the BD signals 401a and 401b output from the BD sensors. A drive control parameter calculator 1602 calculates drive control parameter values A1, A2, and φ on the basis of differences dT1, dT2, and dT3 between the BD-signal-receiving intervals T1, T2, and T3 and desired intervals T10, T20, and T30, respectively, that are set in advance. A coefficient and a matrix M representing changes in T1 to T3 that occur if the drive control parameter values X (X=A1, A2, φ) are slightly changed from the desired parameter values are determined in advance as follows:

$$\left.\frac{\partial t}{\partial X}\right|_{ti}, (X = A1, A2, \phi), (i = 1, 2, 3) \quad (2)$$

$$M = \begin{bmatrix} \left.\frac{\partial t}{\partial A1}\right|_{t1} & \left.\frac{\partial t}{\partial A2}\right|_{t1} & \left.\frac{\partial t}{\partial \phi}\right|_{t1} \\ \left.\frac{\partial t}{\partial A1}\right|_{t2} & \left.\frac{\partial t}{\partial A2}\right|_{t2} & \left.\frac{\partial t}{\partial \phi}\right|_{t2} \\ \left.\frac{\partial t}{\partial A1}\right|_{t3} & \left.\frac{\partial t}{\partial A2}\right|_{t3} & \left.\frac{\partial t}{\partial \phi}\right|_{t3} \end{bmatrix} \quad (3)$$

Therefore, control variables dA1, dA2, and dφ for the drive control parameters can be calculated from the differences dT1, dT2, and dT3 between the detected intervals T1, T2, and T3 and the desired intervals T10, T20, and T30, respectively, using the following equation:

$$\begin{bmatrix} dA1 \\ dA2 \\ d\phi \end{bmatrix} = M^{-1} \begin{bmatrix} dT1 \\ dT2 \\ dT3 \end{bmatrix} \quad (4)$$

The thus-determined control variables dA1, dA2, and dφ are used to correct the drive control parameter values A1, A2, and φ as follows:

$A1(\text{corrected}) = A1(\text{before correction}) + dA1$ $A2(\text{corrected}) = A2(\text{before correction}) + dA2$ $\phi(\text{corrected}) = \phi(\text{before correction}) + d\phi \quad (5)$ The thus-corrected drive control parameter values A1, A2, and φ are output to an arbitrary waveform generator 1603 (corresponding to FIG. 18C) and the drive control parameter storage 104. In addition, the drive control parameter calculator 1602 compares dT1, dT2, dT3 with predetermined thresholds, and determines whether or not dT1, dT2, dT3 are equal to or lower than the respective thresholds. The result of the determination is output to the drive control parameter storage 104. Thus, the drive control parameter storage 104 is informed of whether or not the oscillation system 101 is in the balanced steady state. When the drive unit 106 is activated, the arbitrary waveform generator 1603 outputs a drive control signal based on the stored drive control parameter values used as the reset parameter values A11, A21, and φ1. Then, after the drive unit 106 is activated, the arbitrary waveform generator 1603 outputs a drive control signal based on drive control parameter values A1, A2 and φ output from the drive control parameter calculator 1602.

Updating/Storing Drive Control Parameter Values

Figure 5:
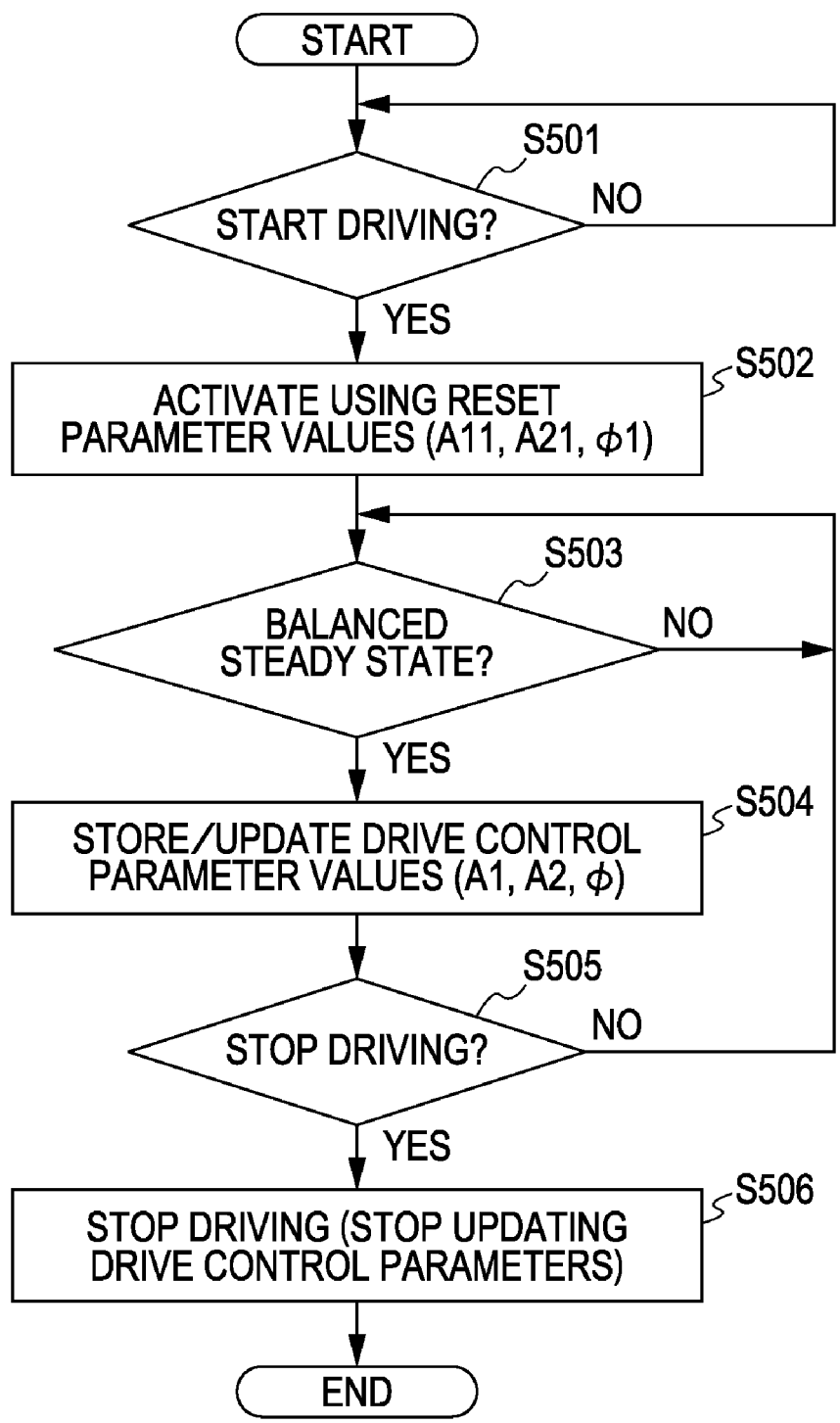
FIG. 5 is a flowchart of a drive control process of the optical deflector according to the first embodiment of the present invention.

FIG. 5 shows a drive control sequence of the optical deflector.

When the drive controller 103 detects a drive start command signal for the drive unit 106 in step S501, the drive controller 103 activates the drive unit 106 using the reset parameter values A11, A21, and φ1 output from the drive control parameter resetting controller 105 in step S502. If step S504 has never been executed and no values are stored as the parameter values A11, A12, and φ1, default values determined so that the oscillation system is reliably prevented from being damaged or values determined in accordance with the environment are used. In step S503, it is determined whether or not the oscillation system 101 is in the balanced steady state. More specifically, the output from the drive control parameter calculator 1602 based on the above-described calculation and representing whether or not the balanced steady state is obtained is checked. If the oscillation system 101 is in the balanced steady state, that is, if the result of the determination is YES in step S503, the drive control parameter storage 104 stores and updates the drive control parameter values A1, A2, and φ in step S504. If it is determined that the oscillation system 101 is not in the balanced steady state in step S503, the drive control parameter values A1, A2, and φ are corrected by performing the calculations of Equations (1) to (5). Then, the determination in step S503 is performed again while the drive unit 106 is driven using the corrected drive control parameter values A1, A2, and φ. The drive control parameter storage 104 repeatedly stores and updates the drive control parameter values A1, A2, and φ in the balanced steady state until the drive controller 103 detects a drive stop command signal for stopping the drive unit 106. Because the drive control parameter values A1, A2, and φ are repeatedly stored and updated, it is possible to deal with the case in which the drive control parameter values for obtaining the balanced steady state are changed for some reason such as sudden change in the environment. When the drive controller 103 detects the drive stop command signal for stopping the drive unit 106 in step S505, the drive controller 103 stops driving the drive unit 106 in step S506 and the drive control parameter storage 104 stops updating the drive control parameter values A1, A2, and φ. Then, when the drive unit 106 is activated the next time (driven again), reset parameter values stored in step S506 are read and used in the drive control operation in step S502. Thus, when the drive unit 106 is activated, the drive unit 106 can be driven using drive control parameter values with which the oscillation system 101 had been stably oscillated the previous time.

In the control process according to the present embodiment, the drive control parameter values are stored and updated each time the optical deflector is driven. When the optical deflector is driven again, the stored and updated drive control parameter values are used to activate the optical deflector. Therefore, the optical deflector can be activated using optimum drive control parameter values irrespective of individual differences in characteristics and variation in environmental conditions. As a result, the activation time can be reduced. If there are no suitable control parameter values that are stored and updated, the oscillation system must be slowly activated so that large overshoot or undershoot does not occur. The reason for this is to prevent the oscillation system from being damaged. Therefore, in the known control method, a large amount of calculation for obtaining the drive control parameter values must be performed until the oscillation system reaches the balanced steady state. In comparison, as shown in the flowchart of FIG. 5, according to the present embodiment, the optical deflector can be activated using suitable drive control parameter values that are stored and updated. Therefore, the activation time of the oscillation system can be reduced.

In the present embodiment, the drive unit 106 is driven using the drive control parameters corresponding to the balanced steady state of the oscillation system 101. However, the drive unit 106 may also be driven using values that can be calculated from the drive control parameter values corresponding to the balanced steady state. For example, values equivalent to 80% of the drive control parameter values corresponding to the balanced steady state can also be used. In other words, values based on the parameter values corresponding to the balanced steady state have the same meaning as the values with which the balanced steady state was obtained. In addition, in the present embodiment, the drive control parameter values are constantly stored and updated while the oscillation system 101 is in the balanced steady state. However, the drive control parameter values can also be stored and updated only when the drive controller 103 detects the drive stop command signal for stopping the drive unit 106 while the oscillation system 101 is in the balanced steady state.

Second Embodiment

A second embodiment of the present invention will now be described.

In the second embodiment, the structures of an image forming apparatus and a laser scanner unit and signals from BD sensors are similar those in the first embodiment, and explanations thereof are thus omitted.

The present embodiment differs from the first embodiment in that a drive control parameter value for one-degree-of-freedom oscillating motion (for example, A1' sin(ω1t)) in a balanced steady state and drive control parameter values for two-degree-of-freedom oscillating motion (for example, motion expressed by Equation (1)) in a balanced steady state are separately stored and updated.

Figure 6:
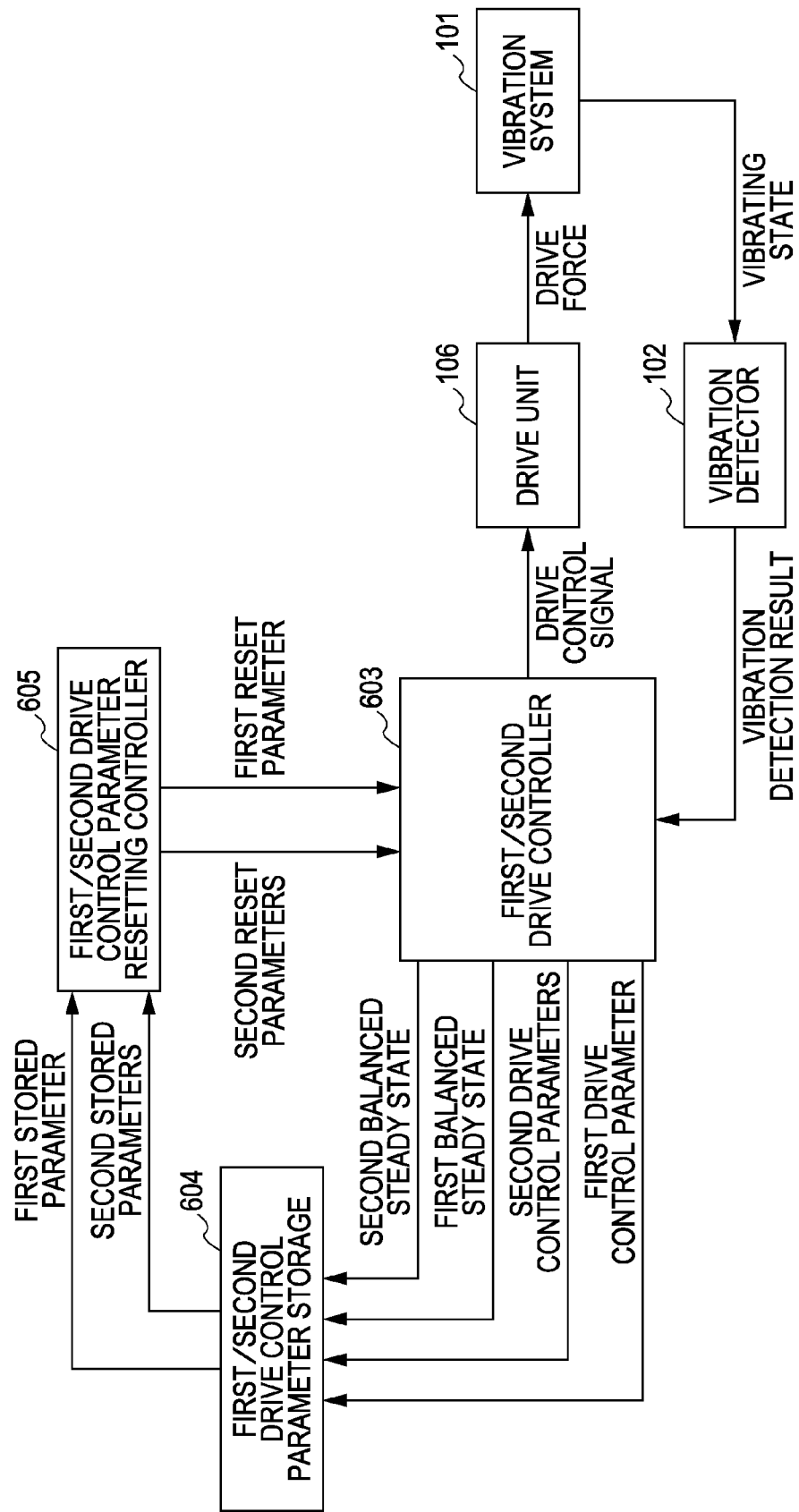
FIG. 6 is a system block diagram illustrating a drive control system of an optical deflector according to a second embodiment of the present invention.

FIG. 6 is a system block diagram illustrating a drive control system of an optical deflector according to the present embodiment.

A oscillation system 101, a oscillation detector 102, and a drive unit 106 are similar to those in the first embodiment. A first/second drive controller 603 calculates the balanced steady state of the oscillation system 101 in one-degree-of-freedom oscillating motion and that in two-degree-of-freedom oscillating motion on the basis of the oscillation detection result obtained by the oscillation detector 102, and outputs the calculation result to a first/second drive control parameter storage 604. The balanced steady state of the oscillation system 101 in the one-degree-of-freedom oscillating motion is hereinafter called a first balanced steady state, and the balanced steady state of the oscillation system 101 in the two-degree-of-freedom oscillating motion is hereinafter called a second balanced steady state. A drive control signal for the one-degree-of-freedom oscillating motion is expressed as "A1 sin(ω1t)", and a drive control signal for the two-degree-of-freedom oscillating motion is expressed as "A1 sin(ω1t)+A2 sin(ω2t+φ)".

The first/second drive control parameter storage 604 stores and updates a drive control parameter value A1 (hereinafter called a first drive control parameter value) in the first balanced steady state and drive control parameter values A1, A2, and φ (hereinafter called second drive control parameter values) in the second balanced steady state. While the oscillation system 101 is in the first balanced steady state, the first/second drive control parameter storage 604 repeatedly stores and updates the first drive control parameter value A1. When the first/second drive controller 603 switches the control from the one-degree-of-freedom oscillating motion to the two-degree-of-freedom oscillating motion and the state of the oscillation system 101 is changed from the first balanced steady state, the first/second drive control parameter storage 604 stops updating the first drive control parameter value A1. While the oscillation system 101 is in the second balanced steady state, the first/second drive control parameter storage 604 repeatedly stores and updates the second drive control parameter values A1, A2, and φ. When the first/second drive controller 603 stops driving the drive unit 106 and the state of the oscillation system 101 is changed from the second balanced steady state, the first/second drive control parameter storage 604 stops updating the second drive control parameter values A1, A2, and φ.

The first/second drive control parameter storage 604 also outputs the first drive control parameter value A1 and the second drive control parameter values A1, A2, and φ stored therein to a first/second drive control parameter resetting controller 605 as a first stored parameter value and second stored parameter values, respectively. The first/second drive control parameter resetting controller 605 outputs the first stored parameter value and the second stored parameter values to the first/second drive controller 603 as a first reset parameter value A10 and second reset parameter values A11, A21, and φ1, respectively. The first/second drive controller 603 activates the drive unit 106 using the first reset parameter value A1. When the first/second drive controller 603 switches the control from the one-degree-of-freedom oscillating motion to the two-degree-of-freedom oscillating motion, the drive unit 106 is driven using the second reset parameter values A11, A21, and φ1.

According to the above-described control process, the first/second drive controller 603 can switch the control to the two-degree-of-freedom oscillating motion after the one-degree-of-freedom oscillating motion of the oscillation system 101 is stabilized. More specifically, first, activation can be slowly started by controlling only the one-degree-of-freedom motion, and then the control can be switched to the two-degree-of-freedom motion after the one-degree-of-freedom motion becomes steady. Therefore, compared to the first embodiment, the drive unit 106 can be activated more stably (without causing a large overshoot or undershoot). In addition, when the one-degree-of-freedom motion is started or when the control is switched to the two-degree-of-freedom motion, drive control parameter values with which steady oscillation had been obtained the previous time are used. Therefore, compared to a known control method in which drive control parameter values that had been used the previous time are not used, the oscillation system can be activated in a shorter time. When the first/second drive controller 603 activates the drive unit 106 for the first time after the image forming apparatus is manufactured, the drive unit 106 is activated using parameter values that are stored in advance. When the image forming apparatus is manufactured, first end second reset parameters that are set in advance are stored in the first/second drive control parameter resetting controller 605.

Figure 17:
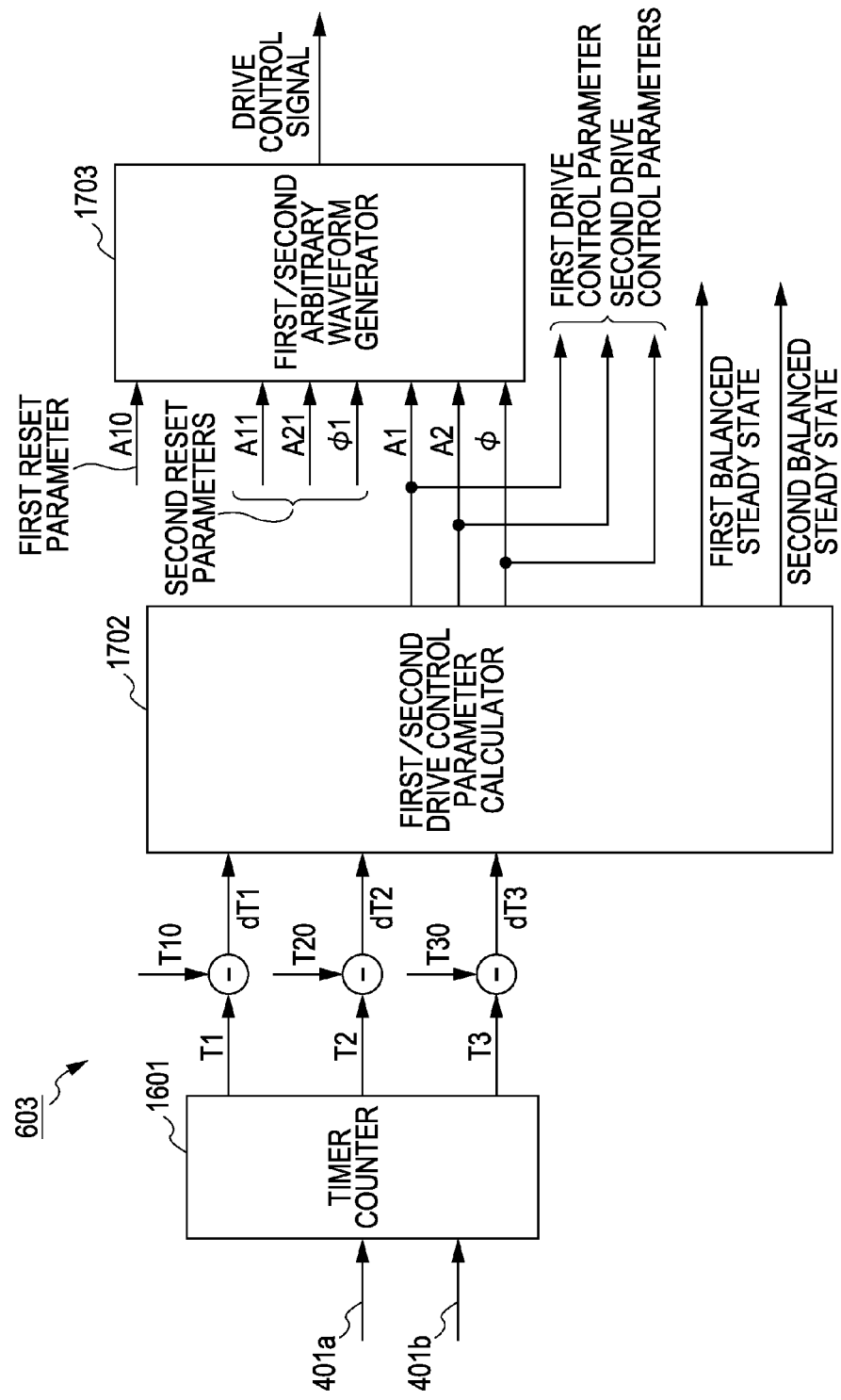
FIG. 17 is a block diagram illustrating a drive control unit included in the optical deflector according to the second embodiment of the present invention.

FIG. 17 is a block diagram of the first/second drive controller 603.

A timer counter 1601 is similar to that in the first embodiment. A first/second drive control parameter calculator 1702 compares dT1, dT2, and dT3 with predetermined thresholds, and thereby informs the first/second drive control parameter storage 604 of whether or not the oscillation system 101 is in the first balanced steady state and whether or not the oscillation system 101 is in the second balanced steady state. A first/second arbitrary waveform generator 1703 outputs a drive control signal based on a first reset parameter value A10 when the one-degree-of-freedom oscillating motion is started, and outputs a drive control signal based on second reset parameter values A11, A21, and φ1 when the two-degree-of-freedom oscillating motion is started. The determination of whether or not the oscillation system 101 is in the second balanced steady state is performed by a method similar to that described in the first embodiment using Equations (1) to (5). Desired values of T1 to T3 are set for each of the first balanced steady state and the second balanced steady state individually, so that it can be determined which of the balanced steady states is obtained.

Figure 7:
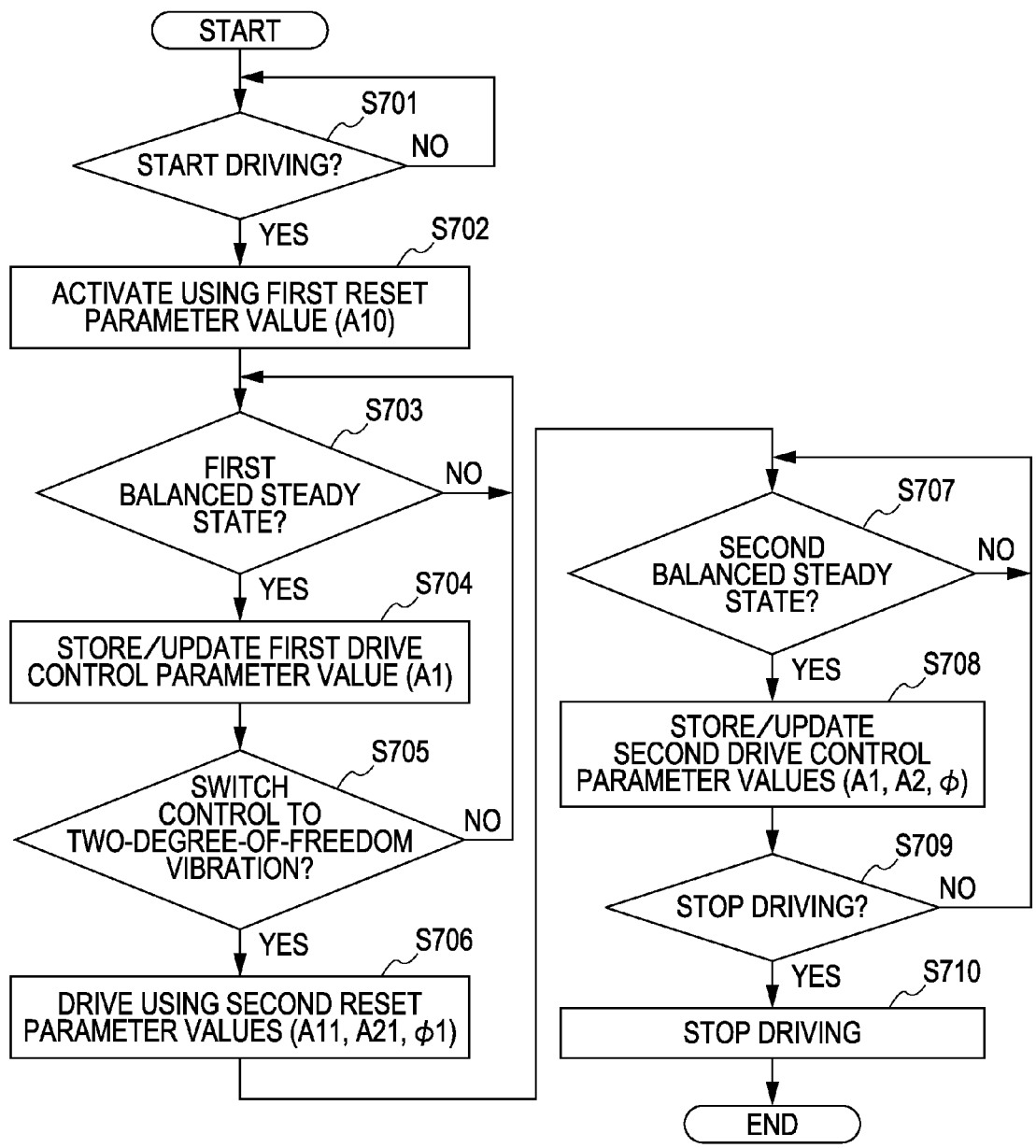
FIG. 7 is a flowchart of a drive control process of the optical deflector according to the second embodiment of the present invention.

FIG. 7 shows a drive control sequence of the optical deflector.

When the first/second drive controller 603 detects a drive start command signal for the drive unit 106 in step S701, the first/second drive controller 603 activates the drive unit 106 using the first reset parameter value A10 in step S702. If step S704 has never been executed and no value is store as the parameter value A10, a default value determined so that the oscillation system is reliably prevented from being damaged or a value determined in accordance with the environment is used.

In step S703, it is determined whether or not the oscillation system 101 is in the first balanced steady state, which serves as a first balancing condition of a plurality of kinds of balancing conditions. If the oscillation system 101 is in the first balanced steady state, that is, if the result of the determination is YES in step S703, the first/second drive control parameter storage 604 stores and updates the first drive control parameter value A1 as A10 in step S704. While the oscillation system 101 is in the first balanced steady state, the first/second drive control parameter storage 604 repeatedly updates the first drive control parameter value A1.

When the first/second drive controller 603 switches the control from the one-degree-of-freedom oscillating motion to the two-degree-of-freedom oscillating motion in step S705, the drive unit 106 is driven using the second reset parameter values A11, A21, and φ1 in step S706. If step S708 has never been executed and no values are stored as the parameter values A11, A12, and φ1, default values determined so that the oscillation system is reliably prevented from being damaged or values determined in accordance with the environment are used. In step S707, it is determined whether or not the oscillation system 101 is in the second balanced steady state, which serves as a second balancing condition of the plurality of kinds of balancing conditions. If the oscillation system 101 is in the second balanced steady state, that is, if the result of the determination is YES in step S707, the first/second drive control parameter storage 604 stores and updates the values of second drive control parameter values A1, A2, and φ as A11, A21, and φ1, respectively, in step S708. While the oscillation system 101 is in the second balanced steady state, the first/second drive control parameter storage 604 repeatedly updates the second drive control parameter values A1, A2, and φ. When the first/second drive controller 603 detects a drive stop command signal for stopping the drive unit 106 in step S709, the first/second drive controller 603 stops driving the drive unit 106 in step S710 and the first/second drive control parameter storage 604 stops updating the second drive control parameter values A1, A2, and φ.

In the control process according to the present embodiment, the oscillation system 101 reaches the second balanced steady state after reaching the first balanced steady state. Therefore, the optical deflector can be stably activated in a short activation time.

In the present embodiment, the drive unit 106 is driven using the drive control parameters corresponding to the first balanced steady state and the second balanced steady state. However, the drive unit 106 may also be driven using values that can be calculated from the drive control parameter values corresponding to the first and second balanced steady states. For example, values equivalent to 80% of the drive control parameter values corresponding to the first (or second) balanced steady state can also be used. In addition, in the present embodiment, the drive control parameter values are constantly stored and updated while the oscillation system 101 is in the first and second balanced steady states. However, the first drive control parameter value can be stored and updated only when the state of the oscillation system 101 is changed from the first balanced steady state to the second balanced steady state and the second drive control parameter values can be stored and updated only when the drive unit 106 is stopped while the oscillation system 101 is in the second balanced steady state.

Third Embodiment

A third embodiment of the present invention will now be described.

In the third embodiment, the structures of an image forming apparatus and a laser scanner unit and signals from BD sensors are similar to those in the second embodiment, and explanations thereof are thus omitted.

The present embodiment differs from the second embodiment in that reset parameter values are changed in accordance with the time elapsed after a drive unit 106 is stopped by a first/second drive controller 603.

Figure 8:
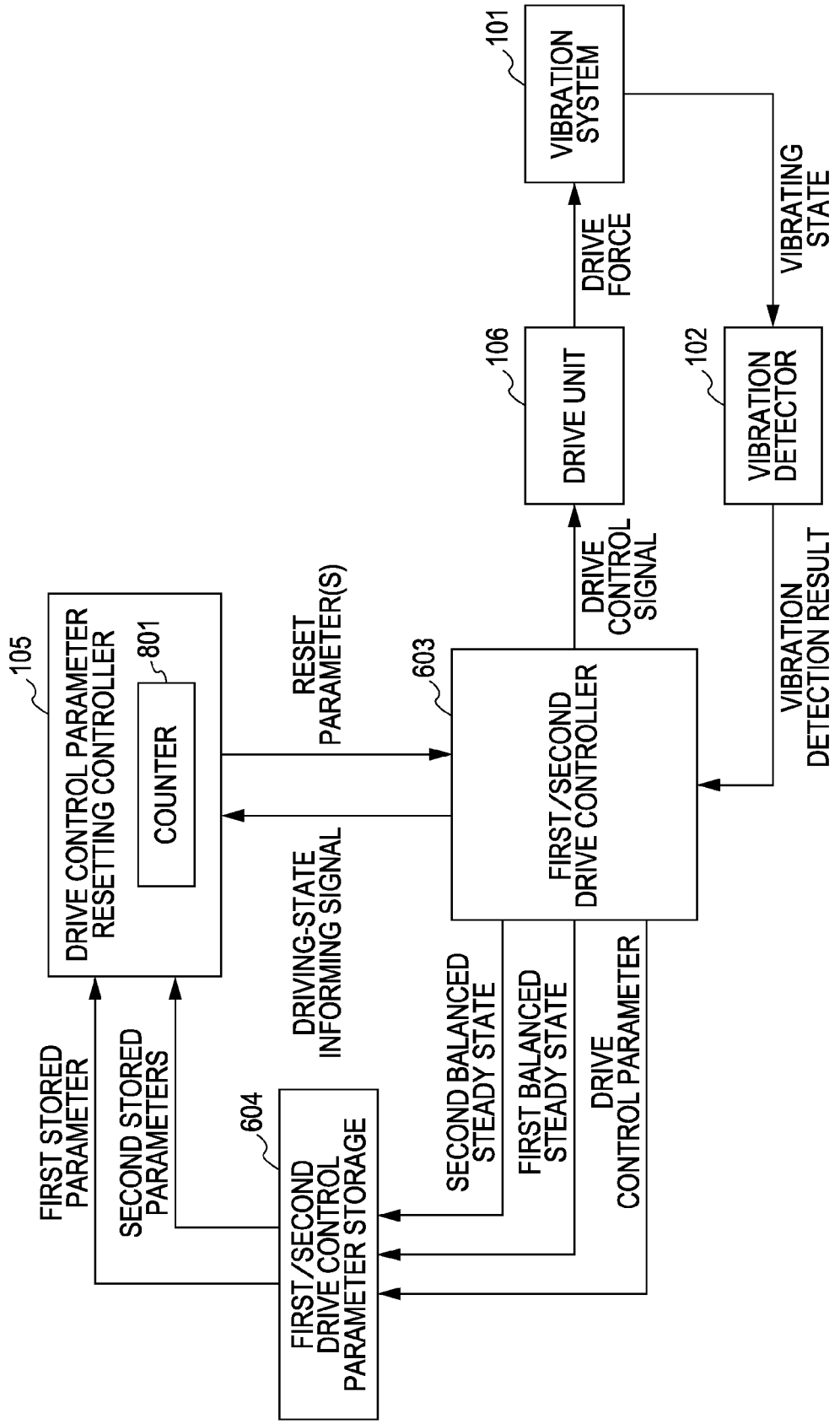
FIG. 8 is a system block diagram illustrating a drive control system of an optical deflector according to a third embodiment of the present invention.

FIG. 8 is a system block diagram illustrating a drive control system of an optical deflector according to the present embodiment.

A oscillation system 101, a oscillation detector 102, the drive unit 106, and a first/second drive control parameter storage 604 are similar to those in the second embodiment. The first/second drive controller 603 outputs a driving-state informing signal representing the driving state of the drive unit 106 to a drive control parameter resetting controller 105. The drive control parameter resetting controller 105 includes a counter 801 which measures the time elapsed after the drive unit 106 is stopped by the first/second drive controller 603. If the measured elapsed time is equal to or less than a set time, the drive control parameter resetting controller 105 outputs second stored parameter values A11, A21, $\phi1$ to the first/second drive controller 603 as reset parameters. If the measured elapsed time is more than the set time, the drive control parameter resetting controller 105 outputs a first stored parameter value A10 to the first/second drive controller 603 as a reset parameter. Then, when the first/second drive controller 603 switches the control from the one-degree-of-freedom oscillating motion to the two-degree-of-freedom oscillating motion, the drive control parameter resetting controller 105 outputs the second stored parameter values A11, A21, and $\phi1$ to the first/second drive controller 603 as the reset parameters. The first/second drive controller 603 activates the drive unit 106 using the values output as the reset parameters.

According to the above-described control process, the first/second drive controller 603 can activate the drive unit 106 in the two-degree-of-freedom oscillating motion if the elapsed time from when the drive unit 106 is stopped to when the drive unit 106 is reactivated is equal to or less than a set time, and in the one-degree-of-freedom oscillating motion if the elapsed time is more than the set time. When the first/second drive controller 603 activates the drive unit 106 for the first time after the image forming apparatus is manufactured, the drive unit 106 is activated using parameter values that are stored in advance. When the image forming apparatus is manufactured, the reset parameter values that are set in advance are stored in the drive control parameter resetting controller 105.

Figure 9:
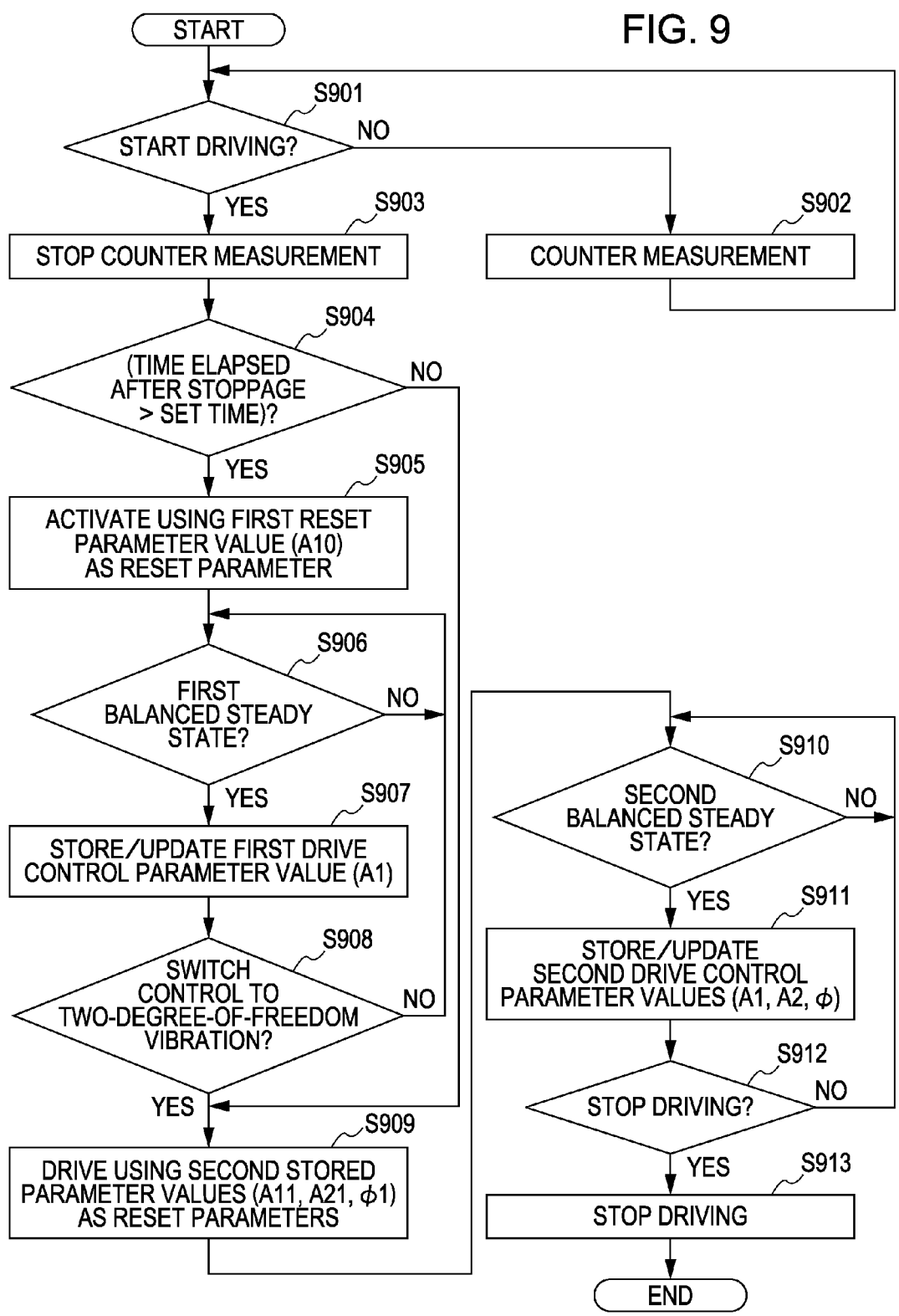
FIG. 9 is a flowchart of a drive control process of the optical deflector according to the third embodiment of the present invention.

FIG. 9 shows a drive control sequence of the optical deflector in the present embodiment.

The drive control parameter resetting controller 105 determines whether or not the drive unit 106 is being driven on the basis of the driving-state informing signal from the first/second drive controller 603 in step S901. If the drive unit 106 is not being driven, the counter 801 performs measurement in step S902. When driving of the drive unit 106 is started, the counter 801 stops the measurement in step S903. In step S904, it is determined whether or not the elapsed time from a reference exceeds a predetermined time period when driving of the drive unit 106 is stated in step S901. The reference can be, for example, the time when the drive unit 106 had been previously stopped or the time when the drive unit 106 had been previously activated. Various parameters, such as the number of pages printed, other than time can also be used. In such a case, in step S904, it is determined whether or not a parameter obtained when driving of the drive unit 106 is restarted exceeds a predetermined threshold. If, for example, the time elapsed after the driving operation was previously stopped is more than the set time in step S904, the drive control parameter resetting controller 105 outputs the first stored parameter value A10 as the reset parameter. Then, the first/second drive controller 603 drives the drive unit 106 using the reset parameter value A10 in step S905.

When the oscillation system 101 reaches the first balanced steady state in step S906, the first/second drive control parameter storage 604 stores and updates the first drive control parameter value A1 in step S907. While the oscillation system 101 is in the first balanced steady state, the first/second drive control parameter storage 604 repeatedly updates the first drive control parameter value A1. When the first/second drive controller 603 switches the control from the one-degree-of-freedom oscillating motion to the two-degree-of-freedom oscillating motion (YES in step S908) or when the time elapsed after the drive unit 106 was previously stopped is equal to or less than the set time in step S904, the following process is performed. That is, the drive control parameter resetting controller 105 immediately sets the second stored parameter values as the reset parameters. Then, the first/second drive controller 603 drives the drive unit 106 in the composite oscillating motion using the reset parameter values A11, A21, and $\phi1$ without determining whether or not the first balanced steady state is obtained as the first balancing condition in step S909.

When the oscillation system 101 reaches the second balanced steady state in step S910, the first/second drive control parameter storage 604 stores and updates the second drive control parameter values A1, A2, and $\phi$ in step S911. While the oscillation system 101 is in the second balanced steady state, the first/second drive control parameter storage 604 repeatedly updates the second drive control parameter values A1, A2, and $\phi$. When the first/second drive controller 603 detects a drive stop command signal in step S912, the first/second drive controller 603 stops driving the drive unit 106 in step S913, and the first/second drive control parameter storage 604 stops updating the second drive control parameter values A1, A2, and $\phi$. When driving of the drive unit 106 is stopped, the drive control parameter resetting controller 105 restarts the measurement of the counter 801 in step S913.

In the control process according to the present embodiment, the optical deflector can be stably activated using the stored drive control parameter values for the two-degree-of-freedom oscillating motion while the time elapsed after the optical deflector is stopped is short. Therefore, compared to the second embodiment, the activation time can be reduced.

In the present embodiment, the drive unit 106 is driven using the drive control parameters corresponding to the first balanced steady state and the second balanced steady state. However, the drive unit 106 may also be driven using values that can be calculated from the drive control parameter values corresponding to the first and second balanced steady states. For example, values equivalent to 80% of the drive control parameter values corresponding to the first (or second) balanced steady state can also be used. In addition, in the present embodiment, the drive control parameter values are constantly stored and updated while the oscillation system 101 is in the first and second balanced steady states. However, the first drive control parameter value can be stored and updated only when the state of the oscillation system 101 is changed from the first balanced steady state to the second balanced steady state and the second drive control parameter values can be stored and updated only when the drive unit 106 is stopped while the oscillation system 101 is in the second balanced steady state.

Fourth Embodiment

A fourth embodiment of the present invention will now be described.

In the fourth embodiment, the structures of an image forming apparatus and a laser scanner unit and signals from BD sensors are similar those in the first embodiment, and explanations thereof are thus omitted.

The present embodiment differs from the first embodiment in that a drive unit 106 is activated without using stored drive control parameter values when a drive controller 103 activates the drive unit 106 after the image forming apparatus is turned off.

Figure 10:
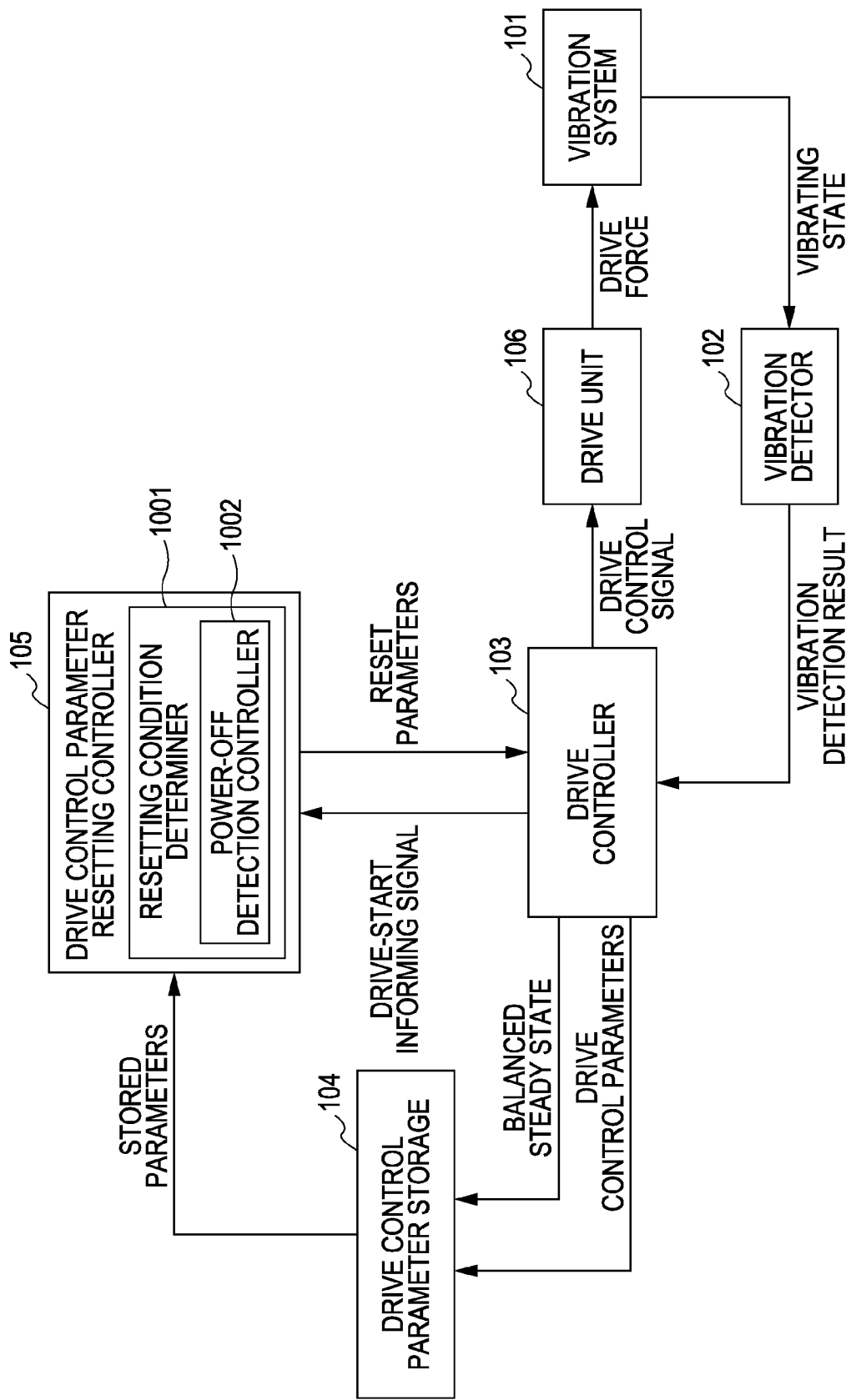
FIG. 10 is a system block diagram illustrating a drive control system of an optical deflector according to a fourth embodiment of the present invention.

FIG. 10 is a system block diagram illustrating a drive control system of an optical deflector according to the present embodiment.

The oscillation system 101, oscillation detector 102, drive control parameter storage 104, and drive unit 106 are similar to those in the first embodiment. The drive controller 103 outputs a drive-start informing signal for informing the start of driving by the drive unit 106 to the drive control parameter resetting controller 105. The drive control parameter resetting controller 105 has a resetting condition determiner 1001 for determining a condition for resetting the stored parameters. The resetting condition determiner 1001 has a power-off detection controller 1002 that checks a reset history (power off history) stored in a memory and detects the power-off state of the image forming apparatus. Even when the power of the image forming apparatus is turned off, a voltage is supplied to the power-off detection controller 1002. When the power-off detection controller 1002 detects the power-off state, the resetting condition determiner 1001 performs a rest control of disabling the stored parameters and outputting preset initial values (hereinafter called initial parameter values) to the drive controller 103. When the power-off state is not detected by the power-off detection controller 1002, the resetting condition determiner 1001 enables the stored parameters and outputs the stored parameters to the drive controller 103 as reset parameters. The drive controller 103 drives the drive unit 106 using the values set as the reset parameters.

Figure 11:
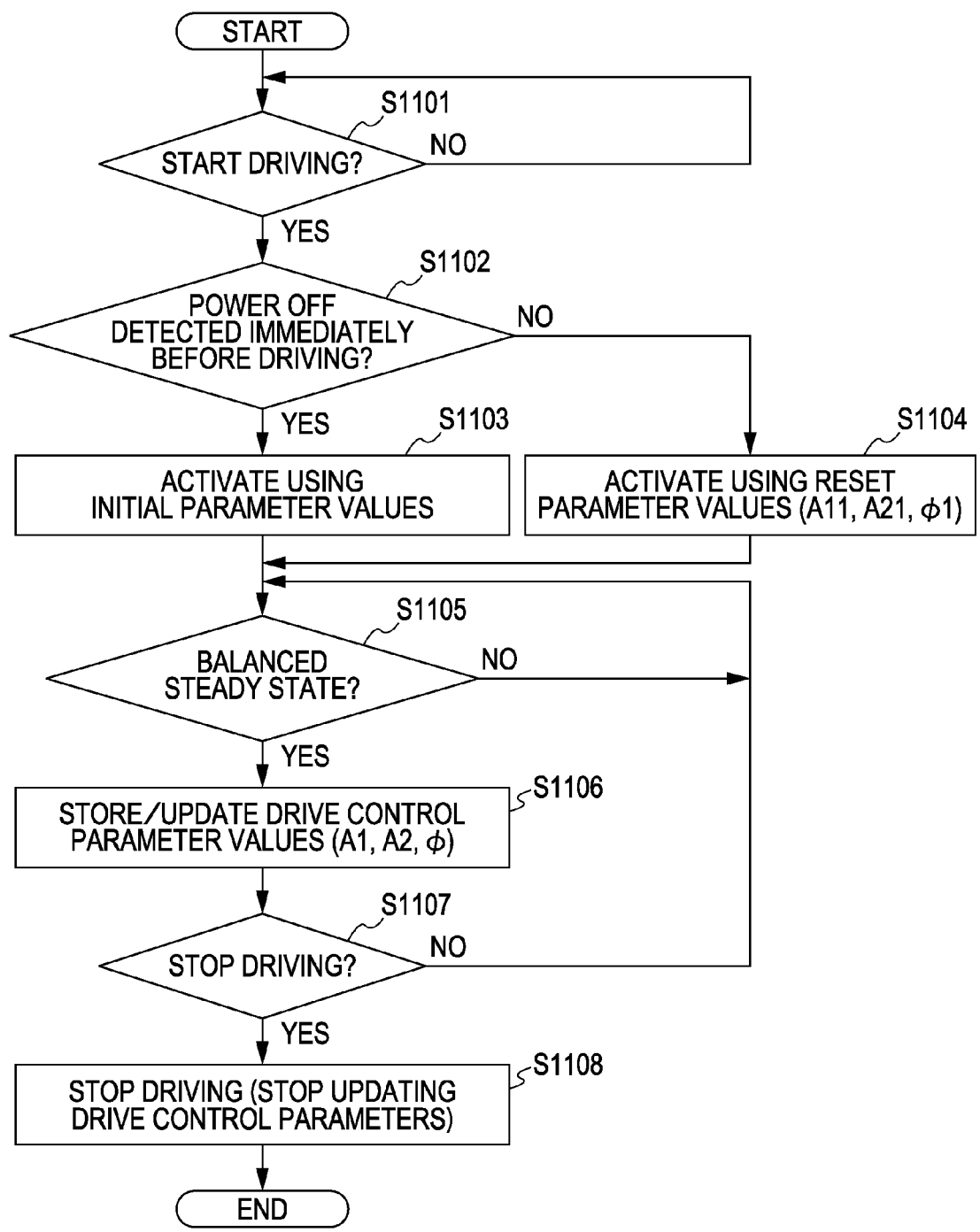
FIG. 11 is a flowchart of a drive control process of the optical deflector according to the fourth embodiment of the present invention.

FIG. 11 shows a drive control sequence of the optical deflector of the present embodiment.

When the power-off detection controller 1002 detects the start of driving of the drive unit 106 by receiving the drive-start informing signal from the drive controller 103 in step S1101, it is determined whether or not the image forming apparatus has been turned off immediately before the start of driving in step S1102. If the image forming apparatus is turned off, the drive control parameter resetting controller 105 outputs predetermined initial parameter values and the drive controller 103 activates the drive unit 106 using the initial parameter values in step S1103. If the image forming apparatus has not been turned off, the drive control parameter resetting controller 105 outputs the stored parameters as reset parameters and the drive controller 103 activates the drive unit 106 using the reset parameters in step S1104.

If the oscillation system 101 reaches the balanced steady state in step S1105, the drive control parameter storage 104 stores and updates the drive control parameters in step S1106. While the drive stop command signal for stopping the drive unit 106 is not detected by the drive controller 103, the drive control parameter storage 104 repeatedly stores and updates the drive control parameters in the balanced steady state. When the drive controller 103 detects the drive stop command signal for stopping the drive unit 106 in step S1107, the drive controller 103 stops driving the drive unit 106 in step S1108 and the drive control parameter storage 104 stops updating the drive control parameters.

In the control process according to the present embodiment, the optical deflector is activated using the preset initial parameter values in a period immediately after the image forming apparatus has been turned off. In such a period, there is a high possibility that the drive control parameter values for obtaining the balanced steady state differ from those used the previous time. Accordingly, the optical deflector is prevented from being driven using inadequate drive control parameters. As a result, the activation time can be prevented from being increased and the optical deflector can be prevented from being damaged.

In the present embodiment, the drive unit 106 is driven using the drive control parameters corresponding to the balanced steady state of the oscillation system 101. However, the drive unit 106 may also be driven using values that can be calculated from the drive control parameter values corresponding to the balanced steady state. For example, values equivalent to 80% of the drive control parameter values corresponding to the balanced steady state can also be used. In addition, in the present embodiment, the drive control parameter values are constantly stored and updated while the oscillation system 101 is in the balanced steady state. However, the drive control parameter values can also be stored and updated only when the drive controller 103 detects the drive stop command signal for stopping the drive unit 106 while the oscillation system 101 is in the balanced steady state.

In addition, in the present embodiment, the optical deflector is activated using the preset initial parameter values in a period immediately after the image forming apparatus has been turned off. However, as described below, the reset control in which the stored parameters are disabled and the optical deflector is activated using the preset initial parameter values can also be performed when another state of the image forming apparatus is detected.

For example, the resetting condition determiner 1001 can include a power-on detection controller (not shown) and the reset control can be performed when the activation is detected immediately after a soft power switch-off state is detected by the power-on detection controller. Alternatively, the resetting condition determiner 1001 can include a reset-time detection controller (not shown). In such a case, the reset-time detection controller detects an elapsed time from when the optical deflector is stopped to when the optical deflector is reactivated, and the reset control is performed if the elapsed time is more than a set time. Alternatively, the resetting condition determiner 1001 can include a jam history detection controller (not shown) that stores a jam history, and the reset control can be performed if activation is detected while the image forming apparatus is in a jammed state. Alternatively, the resetting condition determiner 1001 can include a door-close detection controller (not shown), and the reset control can be performed if activation is detected immediately after a door is closed according to the door-close detection controller. Alternatively, the resetting condition determiner 1001 can include a cartridge replacement history detection controller (not shown) that checks a cartridge replacement history. In such a case, the reset control can be performed if activation is detected after a replacement of a cartridge. Alternatively, for example, the resetting condition determiner 1001 can include an optical-scanner replacement history detection controller (not shown) that checks an optical-scanner replacement history. In such a case, the reset control can be performed if activation is detected immediately after a replacement of an optical scanner.

Fifth Embodiment

A fifth embodiment of the present invention will now be described.

In the fifth embodiment, the structures of an image forming apparatus and a laser scanner unit and signals from BD sensors are similar those in the first embodiment, and explanations thereof are thus omitted.

The present embodiment differs from the first embodiment in that drive control parameters are additionally stored while the oscillation system 101 is in the balanced steady state and the drive unit 106 is driven using the majority result of the thus-stored parameters.

Figure 12:
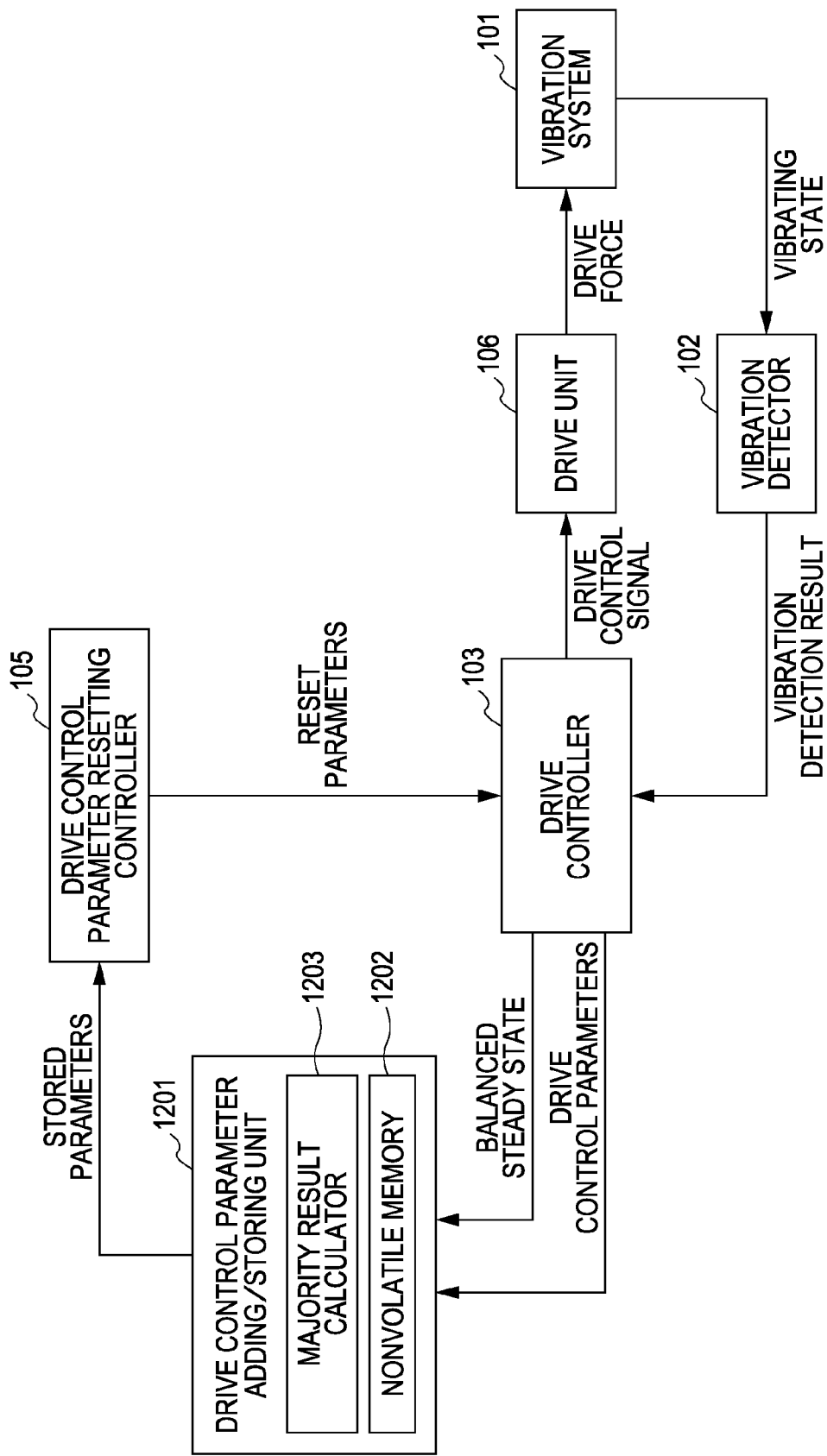
FIG. 12 is a system block diagram illustrating a drive control system of an optical deflector according to a fifth embodiment of the present invention.

FIG. 12 is a system block diagram illustrating a drive control system of an optical deflector according to the present embodiment.

A oscillation system 101, a oscillation detector 102, a drive controller 103, a drive control parameter resetting controller 105, and a drive unit 106 are similar to those in the first embodiment. A drive-control-parameter adding/storing unit 1201, which corresponds to a drive control parameter storage, includes a nonvolatile memory 1202 and a majority result calculator 1203. Each time the oscillation system 101 is driven and reaches the second balanced steady state, the nonvolatile memory 1202 additionally stores the drive control parameters output from the drive controller 103 instead of updating the drive control parameters. The majority result calculator 1203 checks the drive control parameter values stored in the nonvolatile memory 1202 and outputs the most common drive control parameter values to the drive control parameter resetting controller 105 as stored parameters. The drive control parameter resetting controller 105 outputs the stored parameters obtained from the drive-control-parameter adding/storing unit 1201 to the drive controller 103 as the reset parameters. The drive controller 103 activates the drive unit 106 using the values obtained as the reset parameters. When the drive controller 103 activates the drive unit 106 for the first time after the image forming apparatus is manufactured, the drive unit 106 is activated using parameter values that are stored in advance. When the image forming apparatus is manufactured, reset parameter values that are set in advance are stored in the drive control parameter resetting controller 105.

Figure 13:
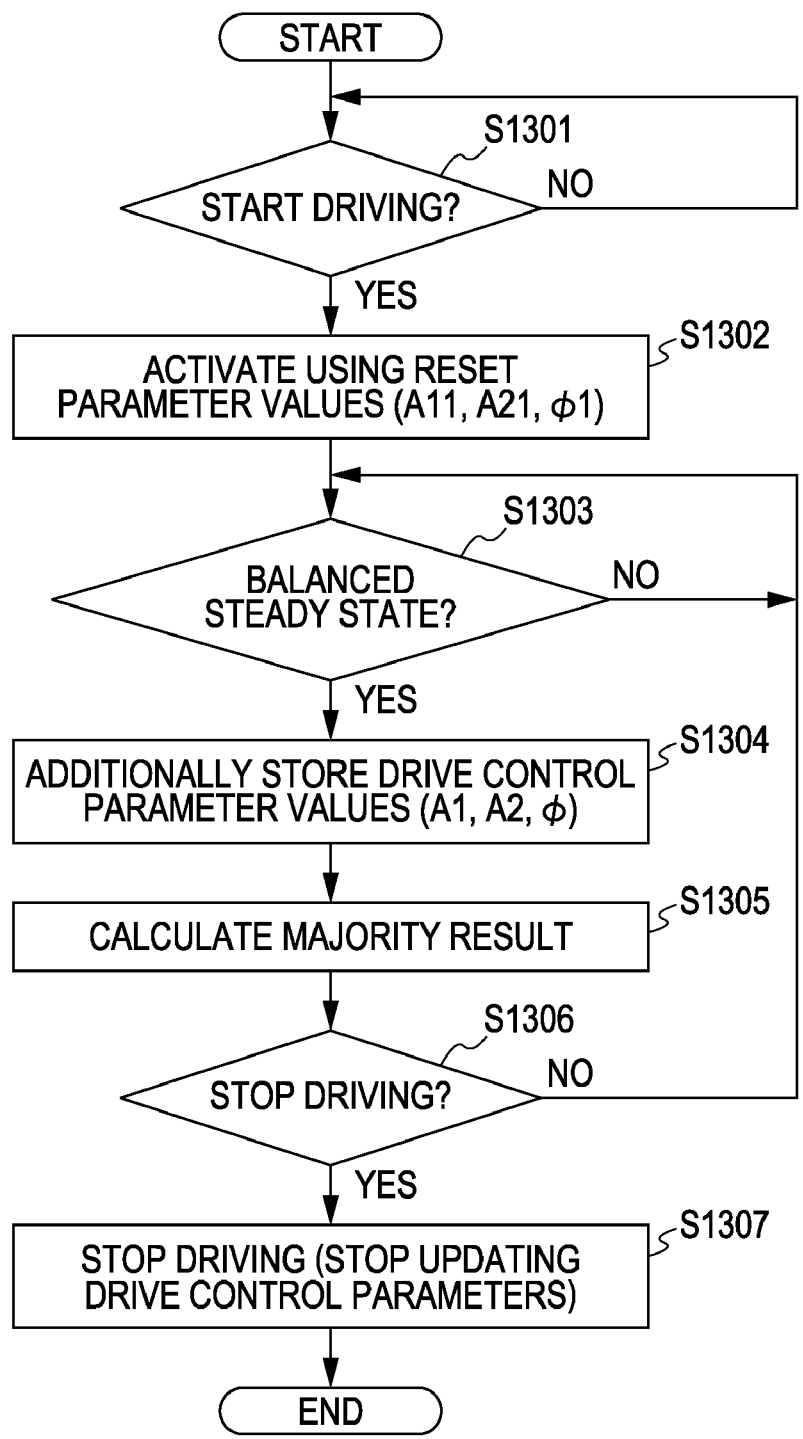
FIG. 13 is a flowchart of a drive control process of the optical deflector according to the fifth embodiment of the present invention.

FIG. 13 shows a drive control sequence of the optical deflector in the present embodiment.

When the drive controller 103 detects a drive start command signal for the drive unit 106 in step S1301, the drive controller 103 activates the drive unit 106 using the reset parameters output from the drive control parameter resetting controller 105 in step S1302. When the oscillation system 101 reaches the balanced steady state of the two-degree-of-freedom oscillating motion in step S1303, the drive-control-parameter adding/storing unit 1201 additionally stores the drive control parameters in step S1304. The majority result calculator 1203 calculates the majority result of the drive control parameters stored in the nonvolatile memory 1202. Then, the drive-control-parameter adding/storing unit 1201 outputs the calculated majority result to the drive control parameter resetting controller 105 as the stored parameters in step S1305. While the drive stop command signal for stopping the drive unit 106 is not detected by the drive controller 103, the drive-control-parameter adding/storing unit 1201 repeatedly stores the drive control parameters in the balanced steady state and outputs the majority result. When the drive controller 103 detects the drive stop command signal for stopping the image forming apparatus in step S1306, the drive controller 103 stops driving the drive unit 106 in step S1307, and the drive-control-parameter adding/storing unit 1201 stops the additional storing of the drive control parameters.

In the control process according to the present embodiment, the optical deflector is activated using drive control parameters with high reliability that have been set most often. Therefore, the activation time of the optical deflector can be reduced.

In the present embodiment, the optical deflector is activated using the drive control parameters that have been set most often. However, the optical deflector can also be activated using values that can be calculated from the drive control parameter values in the balanced steady state that have been set most often. For example, values equivalent to 80% of the drive control parameters that have been set most often can also be used. In addition, although the optical deflector is activated using the drive control parameters that have been set most often in the present embodiment, other kinds of values obtained from the stored drive control parameters can also be used. For example, the average values of the stored drive control parameters can also be used.

Sixth Embodiment

A sixth embodiment of the present invention will now be described.

In the sixth embodiment, the structures of an image forming apparatus and a laser scanner unit and signals from BD sensors are similar those in the fifth embodiment, and explanations thereof are thus omitted.

The present embodiment differs from the fifth embodiment in that an optical deflector is driven without using parameter values stored in a nonvolatile memory 1202 if the stored parameter values have a large dispersion.

Figure 14:
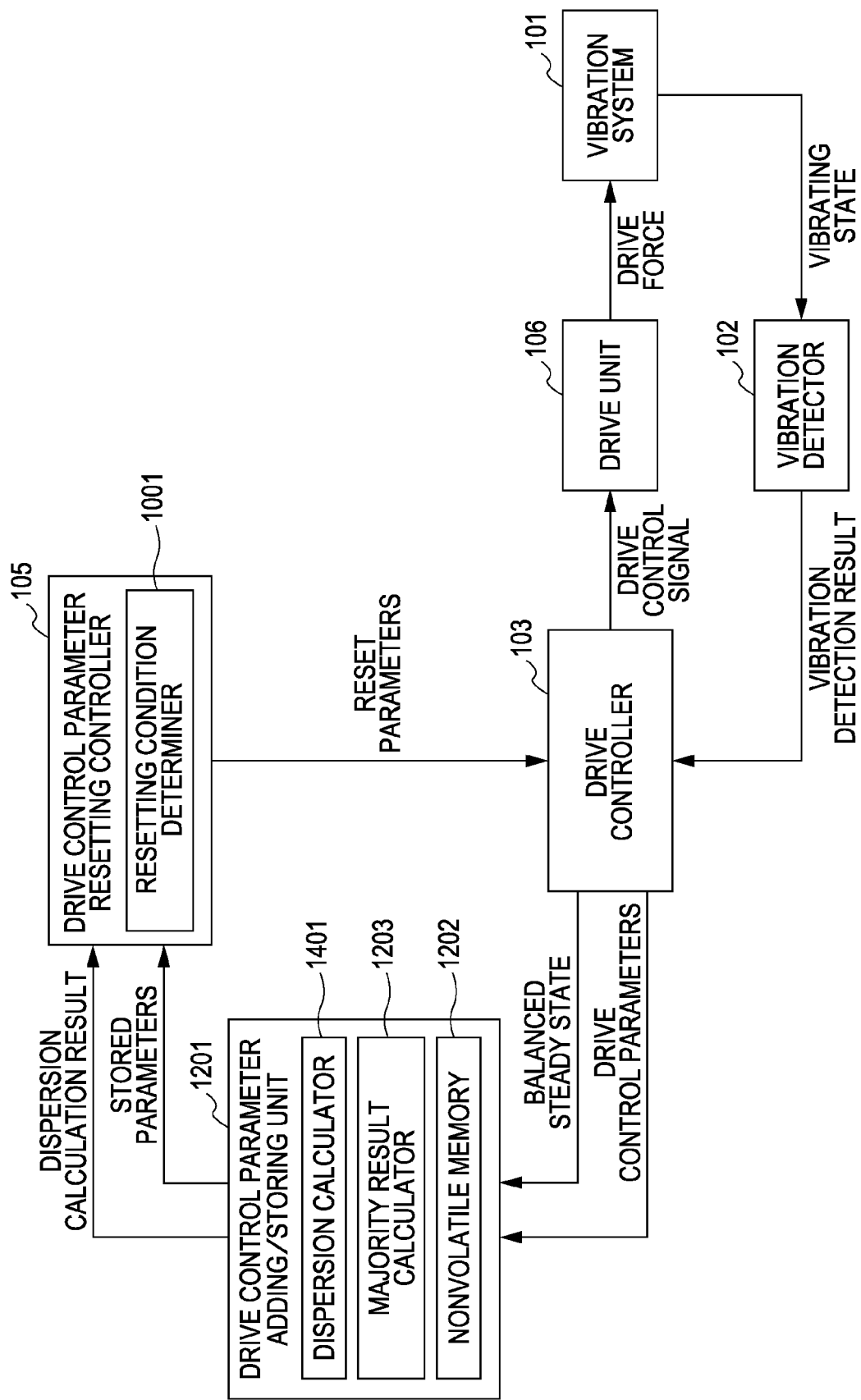
FIG. 14 is a system block diagram illustrating a drive control system of an optical deflector according to a sixth embodiment of the present invention.

FIG. 14 is a system block diagram illustrating a drive control system of an optical deflector according to the present embodiment.

The oscillation system 101, oscillation detector 102, drive controller 103, and drive unit 106 are similar to those in the fifth embodiment. A drive-control-parameter adding/storing unit 1201 includes a dispersion calculator 1401. The dispersion calculator 1401 calculates a standard deviation of drive control parameters stored in the nonvolatile memory 1202 and outputs the standard deviation to a drive control parameter resetting controller 105 as a dispersion calculation result. The majority result calculator 1203 checks the drive control parameter values stored in the nonvolatile memory 1202 and outputs the most common drive control parameter values to the drive control parameter resetting controller 105 as stored parameters. The drive control parameter resetting controller 105 includes a resetting condition determiner 1001 for determining a condition for resetting the drive control parameters. The resetting condition determiner 1001 disables the stored parameters if the dispersion calculation result output from the drive-control-parameter adding/storing unit 1201 is larger than a dispersion threshold and outputs preset initial values (hereinafter called initial parameter values) to the drive controller 103. If the dispersion calculation result is equal to or smaller than the dispersion threshold, the resetting condition determiner 1001 enables the stored parameters and outputs the stored parameters to the drive controller 103 as the reset parameters. The drive controller 103 drives the drive unit 106 using the values set as the reset parameters.

Figure 15:
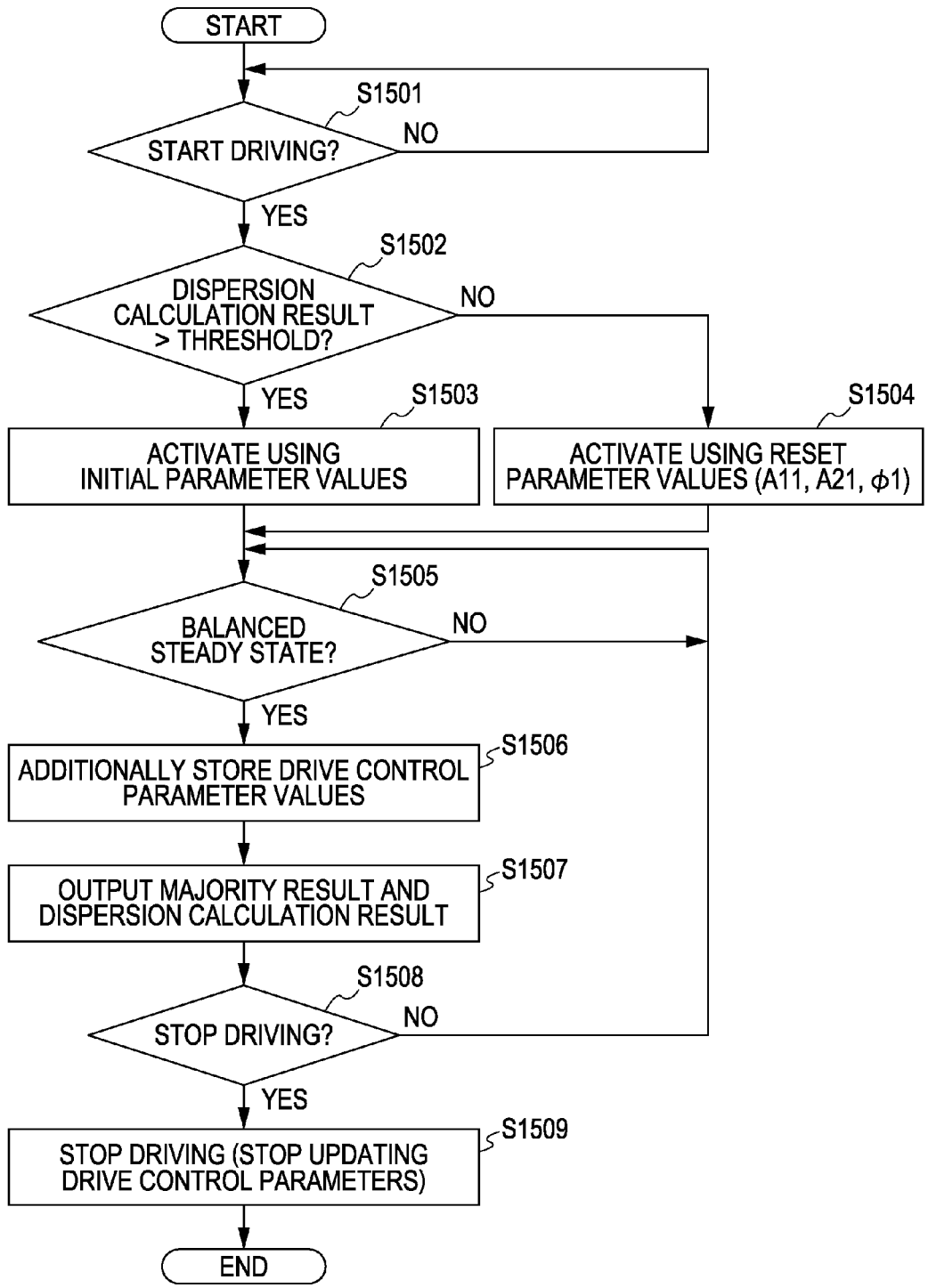
FIG. 15 is a flowchart of a drive control process of the optical deflector according to the sixth embodiment of the present invention.

FIG. 15 shows a drive control sequence of the optical deflector of the present embodiment.

When the drive controller 103 detects a drive start command signal for the drive unit 106 in step S1501, the drive controller 103 checks the reset parameter values output from the drive control parameter resetting controller 105. The resetting condition determiner 1001 determines whether or not the dispersion calculation result based on the drive control parameters that are previously stored is larger than a set threshold in step S1502. If the dispersion calculation result is larger than the set threshold, the drive control parameter resetting controller 105 outputs the preset initial parameter values. Then, the drive controller 103 activates the drive unit 106 using the initial parameter values in step S1503. If the dispersion calculation result is equal to or smaller than the set threshold, the drive control parameter resetting controller 105 outputs the stored parameters as the reset parameters. Then, the drive controller 103 drives the drive unit 106 using the reset parameters in step S1504. When the oscillation system 101 reaches the balanced steady state of the two-degree-of-freedom oscillating motion in step S1505, the drive-control-parameter adding/storing unit 1201 additionally stores the drive control parameters in step S1506. In addition, the drive-control-parameter adding/storing unit 1201 outputs the majority result and the dispersion calculation result based on the stored drive control parameters to the drive control parameter resetting controller 105 in step S1507. While the drive stop command signal for stopping the drive unit 106 is not detected by the drive controller 103, the drive-control-parameter adding/storing unit 1201 repeatedly stores the drive control parameters and outputs the majority result and the dispersion calculation result. When the drive controller 103 detects the drive stop command signal for stopping the drive unit 106 in step S1508, the drive controller 103 stops driving the drive unit 106 in step S1509, and the drive-control-parameter adding/storing unit 1201 stops the additional storing of the drive control parameters.

In the control process according to the present embodiment, when the reliability of the stored parameters is low, the optical deflector is activated using the preset initial parameter values. Accordingly, the optical deflector is prevented from being driven using inadequate drive control parameters. As a result, the activation time can be prevented from being increased and the optical deflector can be prevented from being damaged.

In the present embodiment, the optical deflector is activated using the drive control parameters that have been set most often. However, the optical deflector can also be activated using values that can be calculated from the drive control parameter values that have been set most often. For example, values equivalent to 80% of the drive control parameters that have been set most often can be used. In addition, in the present embodiment, the standard deviation is obtained as the dispersion calculation value. However, other kinds of values that can be calculated from the drive control parameter values can also be obtained as the dispersion calculation value. For example, a value obtained by subtracting the minimum drive control parameter value from the maximum drive control parameter value can be used. In addition, in the present embodiment, the optical deflector is activated using the initial parameter values when the stored drive control parameters have a large dispersion. However, the optical deflector can also be activated using the initial parameter values when all of the stored drive control parameters differ from each other.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-297668 filed Nov. 1, 2006, which is hereby incorporated by reference herein in its entirety.

What is claimed is:

1. An image forming apparatus having an exposure unit and a light source, the exposure unit including an oscillation system and a drive unit, the oscillation system including a first oscillating member having a reflective element, and a second oscillating member connected to the first oscillating member by a torsion member, the second oscillating member having a permanent magnet, and the drive unit arranged to apply a torque to the permanent magnet, thereby transmitting a drive force to the first and second oscillating members so that the first and second oscillating members oscillate about an axis of the torsion member, and the light source arranged to emit a light beam, wherein the exposure unit scans the light beam emitted to the reflective element of the first oscillating member when activated, the image forming apparatus comprising:
    an oscillation detecting unit arranged to detect a oscillation state of the oscillation system;
    a drive control unit configured to control oscillation of the oscillation system such that the oscillation system oscillates in a balanced steady state by adjusting the drive force caused by the drive unit with one or more drive control parameter values, said drive control parameter values being determined on the basis of the detection result obtained by the oscillation detecting unit;
    a parameter storing unit arranged to store the drive control parameter values when the balanced steady state is detected by the oscillation detecting unit; and
    a parameter resetting unit configured to set the drive control parameter values stored in the parameter storing unit to the drive control unit when the exposure unit is next activated.

2. The image forming apparatus according to claim 1, wherein the parameter storing unit stores a plurality of drive control parameter values for a first balancing condition and a second balancing condition, and
    wherein, when the control is changed from the first balancing condition to the second balancing condition, the parameter resetting control unit sets one or more of the plurality of drive control parameter values that correspond to the condition after the change to the drive control unit.

3. The image forming apparatus according to claim 1, wherein the oscillation system is capable of simultaneously performing a first oscillating motion at a first frequency and a second oscillating motion at a second frequency, and
    wherein the drive control parameter values include an amplitude of the first oscillating motion, an amplitude of the second oscillating motion, and a phase difference between the first frequency and the second frequency.

4. The image forming apparatus according to claim 3, wherein the drive control unit causes the oscillation system to perform the first oscillating motion, waits for the oscillation system to satisfy a first balancing condition for the first oscillating motion, changes a balancing condition from the first balancing condition to a second balancing condition when the first balancing condition is satisfied, and starts a composite oscillating motion in which the first oscillating motion and the second oscillating motion are simultaneously performed,
    wherein the parameter storing unit stores a plurality of drive control parameter values for the first and second balancing conditions, and
    wherein the parameter resetting control unit sets one or more of the plurality of drive control parameter values to the drive control unit in accordance with whether the first balancing condition or the second balancing condition is used.

5. The image forming apparatus according to claim 4, wherein the parameter resetting control unit causes the oscillation system to perform the composite oscillating motion without determining whether or not the first balancing condition is satisfied if a certain threshold is not reached when the drive unit is reactivated.

6. The image forming apparatus according to claim 1, wherein the parameter resetting control unit includes a resetting condition determining unit configured to check a resetting condition for resetting the drive control parameter values when the drive unit drives the oscillation system, and wherein the resetting condition determining unit performs a reset control to disable the drive control parameter values stored in the parameter storing unit and set one or more preset initial values to the drive control unit on the basis of the check result of the resetting condition.

7. The image forming apparatus according to claim 6, wherein the resetting condition determining unit includes a jam history detection control unit configured to store a jam history and perform the reset control if an activation is detected while the image forming apparatus is in a jammed state according to the jam history.

8. The image forming apparatus according to claim 6, wherein the resetting condition determining unit includes a cartridge replacement history detection control unit configured to check a cartridge replacement history and perform the reset control if an activation is detected after replacement of a cartridge on the basis of the check result of the cartridge replacement history.

9. The image forming apparatus according to claim 1, wherein the parameter storing unit additionally stores the drive control parameter values output from the drive control unit if it is determined that the oscillation system is in the balanced steady state on the basis of information of the balanced steady state output from the drive control unit, and wherein the parameter resetting control unit sets one or more drive control parameter values determined on the basis of the drive control parameters stored in the parameter storing unit to the drive control unit.

10. The image forming apparatus according to claim 9, wherein the one or more drive control parameter values set to the drive control unit by the parameter resetting control unit includes a drive control parameter value determined on the basis of the average of the drive control parameters stored in the parameter storing unit.

11. The image forming apparatus according to claim 9, wherein the parameter storing unit includes a majority result calculating unit configured to calculate a most common drive control parameter value in the drive control parameter values stored in the parameter storing unit, and wherein the parameter resetting control unit sets the drive control parameter calculated by the majority result calculating unit to the drive control unit.

12. The image forming apparatus according to claim 9, wherein the parameter resetting control unit includes a resetting condition determining unit configured to check a resetting condition for resetting the drive control parameter values when the drive unit drives the oscillation system, and wherein the resetting condition determining unit performs a reset control of disabling the drive control parameter values stored in the parameter storing unit and setting one or more preset initial values to the drive control unit if all of the drive control parameter values stored in the in the parameter storing unit are different from each other.

13. The image forming apparatus according to claim 9, wherein the parameter resetting control unit includes a resetting condition determining unit configured to check a resetting condition for resetting the drive control parameter values when the drive unit drives the oscillation system, and wherein the resetting condition determining unit performs a reset control of disabling the drive control parameter values stored in the parameter storing unit and setting one or more preset initial values to the drive control unit if a dispersion of the drive control parameter values stored in the parameter storing unit is larger than a predetermined threshold.

* * * * *